(12) United States Patent
Hara et al.

(10) Patent No.: US 6,362,248 B1
(45) Date of Patent: Mar. 26, 2002

(54) PHOTOCHROMIC POLYMERIZABLE COMPOSITION

(75) Inventors: Tadashi Hara; Yuichiro Kawabata; Junji Momoda; Hironobu Nagoh, all of Tokuyama (JP)

(73) Assignee: Tokuyama Corporation, Yamaguchi-Ken (JP)

( * ) Notice: Subject to any disclaimer, the term of this patent is extended or adjusted under 35 U.S.C. 154(b) by 0 days.

(21) Appl. No.: 09/381,812

(22) PCT Filed: Jan. 26, 1999

(86) PCT No.: PCT/JP99/00308

§ 371 Date: Dec. 20, 1999

§ 102(e) Date: Dec. 20, 1999

(87) PCT Pub. No.: WO99/37734

PCT Pub. Date: Jul. 29, 1999

(30) Foreign Application Priority Data

Jan. 26, 1998 (JP) ............................... 98-12924

(51) Int. Cl.[7] ............................ C09K 9/02; C09K 9/00; G02C 7/10; G02B 1/04; G02B 5/23

(52) U.S. Cl. ............................ 522/26; 522/14; 522/16; 522/63; 522/170; 522/182; 522/103; 526/204; 252/586

(58) Field of Search .................... 522/75, 100, 168, 522/170, 182, 16, 26, 14, 63; 252/586; 526/204

(56) References Cited

U.S. PATENT DOCUMENTS 5,395,566 A * 3/1995 Kobayakawa et al.
5,621,017 A * 4/1997 Kobayakawa et al.
5,776,376 A * 7/1998 Nagoh et al.
5,783,116 A * 7/1998 Lin
5,811,034 A * 9/1998 Lin
5,869,658 A * 2/1999 Lin et al.
5,879,591 A * 3/1999 Nagoh et al.
5,879,592 A * 3/1999 Kumar
5,910,516 A * 6/1999 Imura et al.
6,194,511 B1 * 2/2001 Momoda et al.
6,197,225 B1 * 3/2001 Tanizawa et al.

FOREIGN PATENT DOCUMENTS

| JP | 8-157467 A | * 6/1996 |
| JP | 8-176139 A | * 7/1996 |
| JP | 8-295690 A | * 11/1996 |
| JP | 9-302336 A | * 11/1997 |
| WO | WO 96/37573 | * 11/1996 |
| WO | 96-37574 | * 11/1996 |
| WO | 96-37575 | * 11/1996 |
| WO | WO98/57943 | * 12/1998 |

* cited by examiner

Primary Examiner—Susan W. Berman

(57) ABSTRACT

A photochromic polymerizable composition comprising (a) a polyfunctional (meth)acrylate monomer, (b) at least one kind of chromene compound selected from the group consisting of three kinds of chromene compounds represented by particular structural formulas, and (c) a compound having at least one or more epoxy groups in the molecules. The photochromic polymerizable composition offers a photochromic material that exhibits little initial color and excellent photochromism resistance suited for use as lenses for spectacles.

18 Claims, No Drawings ical field

The present invention relates to a photochromic polymerizable composition that gives a cured product exhibiting excellent photochromic action, and to a photochromic material containing the photochromic polymerizable composition.

BACKGROUND ART

Photochromism is a phenomenon which is drawing attention in these several years and stands for a reversible action in that the color of a given compound quickly changes when it is irradiated with light containing ultraviolet rays, such as sunlight or light of a mercury lamp, and the compound assumes the initial color when it is no longer irradiated with light and is placed in a dark place. The compound having such a property is called photochromic compound. Compounds having various colors have heretofore been synthesized accompanied, however, by a problem in regard to photochromism resistance when the compounds are repetitively subjected to the reversible change.

Therefore, there have been developed photochromic compounds having improved photochromism resistance, such as oxazine-type photochromic compounds (hereinafter simply referred to as oxazine compounds), fulgimide-type photochromic compounds (hereinafter simply referred to as fulgimide compounds) and chromene-type photochromic compounds (hereinafter simply referred to as chromene compounds) (U.S. Pat. Nos. 4,882,438, 4,960,678, 5,130,058, Japanese Unexamined Patent Publication (Kokai) No. 288830/1987, U.S. Pat. No. 5,106,998, Japanese Unexamined Patent Publication (Kokai) Nos. 28154/1990, 11074/1991, 133988/1991).

These photochromic compounds exhibit excellent photochromism resistance. In particular, the above-mentioned chromene compounds are, generally, little deteriorated by light. When continuously irradiated with sunlight or light close to sunlight, these chromene compounds little lose performance for developing color and exhibit excellent photochromism resistance.

However, when it is attempted to obtain a photochromic material such as photochromic lenses for spectacles by mixing the chromene compound to the polymerizable monomer to polymerize them, a problem often occurs in the obtained photochromic material though there arouses no particular problem in the photochromic compound itself. That is, according to the study conducted by the present inventors, it became obvious that when a particular chromene compound is used as a photochromic compound for a polyfunctional (meth)acrylate monomer that is widely used as a monomer for obtaining a photochromic material such as lenses for spectacles, it is not allowed to obtain a photochromic material having good photochromism resistance, and the photochromic material itself develops a color (hereinafter often referred to as "initial color). This is a serious problem for the photochromic material such as lenses of spectacles which strongly reflect the likings of the users. Therefore, it has been desired to provide a photochromic material that does not exhibit initial color.

In order to improve the photochromism resistance of the photochromic material containing a chromene compound, PCT laid-open specification WO 96/37576 discloses a method which adds a hindered aminoether-type photostabilizer to a thermoplastic resin such as polyvinyl chloride or polycarbonate containing a benzochromene compound. The inventors have added the above-mentioned particular chromene compound to the polyfunctional (meth)acrylate that has been placed in the market together with the above-mentioned hindered aminoether-type photostabilizer. However, the photochromism resistance was not improved to a sufficient degree, and the development of the initial color could not be suppressed. (Disclosure of the Invention)

The object of the present invention is to solve the problem of initial color specific to the photochromic material obtained by curing the photochromic polymerizable composition that contains a particular chromene compound and a polyfunctional (meth)acrylate monomer, and to solve the problem of decrease in the photochromism resistance.

The present invention is proposed in order to accomplish the above-mentioned object, and is based on a discovery that an initial color is little exhibited and a large photochromism resistance is obtained by a photochromic material that is obtained by curing a photochromic polymerizable composition formed by adding an epoxy compound to the above-mentioned photochromic polymerizable composition that contains a particular chromene compound and a polyfunctional (meth)acrylate monomer.

That is, the present invention is concerned with a photochromic polymerizable composition comprising:

a) a polyfunctional (meth)acrylate monomer;
b) at least one kind of a chromene compound selected from the group consisting of a chromene compound represented by the following general formula (1),

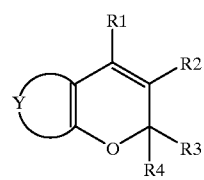

(1)

wherein a divalent group represented by the following general formula (2),

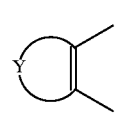

(2)

is a divalent aromatic hydrocarbon cyclic group or an unsaturated heterocyclic group that may have a substituent (and where Y is a corresponding divalent organic group), said divalent aromatic hydrocarbon cyclic group or said unsaturated heterocyclic group having, as a substituent, at least one or more substituted or unsubstituted amino groups or substituted or unsubstituted nitrogen-containing heterocyclic groups having, as a hetero atom, a nitrogen atom that is bonded to said aromatic hydrocarbon cyclic group or said unsaturated heterocyclic group, R1 and R2 may the same or different and are hydrogen atoms, halogen atoms, alkyl groups or aralkyl groups, R3 and R4 may be the same or different and are alkyl groups, aryl groups or aromatic heterocyclic groups that may have a substituent, and wherein R3 and R4 may be bonded to each other to form a ring, a chromene compound represented by the following general formula (3),

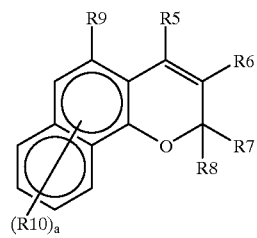

(3)

wherein R5 and R6 may be the same or different and are hydrogen atoms, halogen atoms, alkyl groups or aralkyl groups, R7 and R8 may be the same or different and are aryl groups or aromatic heterocyclic groups that may have a substituent, and wherein R7 and R8 may be bonded to each other to form a ring and at least either one of R7 and R8 has, as a substituent, at least one or more substituted or unsubstituted amino groups, or substituted or unsubstituted nitrogen-containing heterocyclic groups having, as a hetero atom, a nitrogen atom bonded to a carbon atom of said aryl group, aromatic heterocyclic group or in the ring formed by the bonding of the groups R7 and R8, R9 is a primary, secondary or tertiary alkyl group, a substituted or unsubstituted amino group, a substituent other than the nitrogen-containing heterocyclic group that has, as a hetero atom, a nitrogen atom bonded to a benzochromene ring, or a hydrogen atom, R10 is a substituted or unsubstituted amino group on the sixth position, seventh position, eighth position, ninth position and/or tenth position of the benzchromene ring, or a substituent other than the nitrogen-containing heterocyclic group having, as a hetero atom, a nitrogen atom bonded to the benzochromene ring, a is an integer of 0 to 3 representing the number of the substituents, and when a is 2 or larger, the groups R10 may be the same or different, and a chromene compound represented by the following general formula (4),

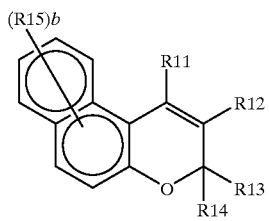

(4)

wherein R11 and R12 may be the same or different and are hydrogen atoms, halogen atoms, alkyl groups or aralkyl groups, R13 and R14 may be the same or different and are aryl groups or aromatic heterocyclic groups that may have a substituent and wherein R13 and R14 may be bonded to each other to form a ring, and at least either one of R13 and R14 has, as a substituent, at least one or more substituted or unsubstituted amino groups, or substituted or unsubstituted nitrogen-containing heterocyclic groups having, as a hetero atom, a nitrogen atom that is bonded to a carbon atom of said aryl group, aromatic heterocyclic group or in the ring formed by the bonding of the groups R13 and R14, R15 is a substituted or unsubstituted amino group on the fifth position, sixth position, seventh position, eighth position, ninth position and/or tenth position of the benzochromene ring, or is a substituent other than the nitrogen-containing heterocyclic group having, as a hetero atom, a nitrogen atom bonded to the benzochromene ring, b is an integer of 0 to 3 representing the number of the substituents, and when b is 2 or larger, the groups R15 may be the same or different, and, c) a compound having at least one or more epoxy groups in the molecules.

The photochromic polymerizable composition of the present invention may further contain (d) a polymerization initiator.

Another invention is concerned with a photochromic material comprising the above-mentioned photochromic polymerizable composition.

The photochromic polymerizable composition of the present invention gives a photochromic material that can be favorably used as lenses for spectacles little developing initial color and exhibiting excellent photochromism resistance.

BEST MODE FOR CARRYING OUT THE INVENTION

<Component (a)>

First, described below is a polyfunctional (meth)acrylate monomer which is the component (a) of the photochromic polymerizable composition of the present invention.

There is no particular limitation on the polyfunctional (meth)acrylate monomer used in the present invention provided it has two or more polymerizable groups such as (meth)acryloyl groups in the molecules. There can be used a known polyfunctional (meth)acrylate monomer that is widely used as a monomer for lenses for spectacles.

Concrete examples of the representative polyfunctional (meth)acrylate monomer that can be used in the present invention include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, polybutylene di(meth)acrylate, 1,6-hexanediol di(meth)acrylate, neopentyl glycol di(meth)acrylate, 2,2'-bis(4-(meth)acryloyloxyethoxyphenyl)propane, 2,2-bis(4-(meth)acryloyloxy-polyethoxyphenyl)propane, 2,2-bis(4-(meth)acryloyloxypropoxyphenyl)propane, 2,2-bis(4-(meth)acryloyloxy-polypropoxyphenyl)propane, 2,2-bis(3,5-dibromo-4-(meth)acryloyloxyethoxyphenyl)propane, esterified compound of di(meth)acrylic acid of a hydrogenated bisphenol A ethylene oxide adduct, dimethyloltricyclodecane polyethoxydi(meth)acrylate, trimethylolpropane tri(meth)acrylate, reaction product of ethylene glycol or polyethylene glycol with glycidyl (meth)acrylate, reaction product of propylene glycol or polypropylene glycol with glycidyl (meth)acrylate, reaction product of bisphenol A ethylene oxide or propylene oxide adduct with glycidyl (meth)acrylate, and reaction product of hydrogenated bisphenol A ethylene oxide or propylene oxide adduct with glycidyl (meth)acrylate.

These polyfunctional (meth)acrylates may be used in one kind or being mixed in two or more kinds, or may be used in the form of an oligomer by being partly polymerized in advance.

In the photochromic polymerizable composition of the present invention, a known monomer may be added as required as a copolymerizable monomer in addition to the above-mentioned polyfunctional (meth)acrylate monomer in order to improve mechanical properties of the photochromic material obtained by curing the polymerizable composition. Suitable examples of the copolymerizable monomer include monofunctional (meth)acrylate monomers such as methyl (meth)acrylate, ethyl (meth)acrylate, butyl (meth) acrylate, isobornyl (meth)acrylate, benzyl (meth)acrylate, phenyl (meth)acrylate, phenoxymethyl (meth)acrylate, phenoxypolyethylene glycol (meth)acrylate, alkoxypolyethylene glycol (meth)acrylate, 2-hydroxyethyl(meth)acrylate and tribromophenyl (meth)acrylate; multi-valent allyl compounds such as diallyl phthalate, diallyl terephthalate, diallyl isophthalate, diallyl tartarate, diallyl epoxysuccinate, diallyl fumarate, diallyl chlorendate, diallyl hexaphthalate, diallyl carbonate, allyl diglycol carbonate and trimethylolpropanetriallyl carbonate; multi-valent thioacrylic acid and esterified compounds of multi-valent thiomethacrylic acid such as 1,2-bis(methacryloylthio)ethane, bis(2-acryloylthioethyl) ether, and 1,4-bis(methacryloylthiomethyl)benzene; and aromatic vinyl compounds such as divinylbenzene, styrene, chlorostyrene, α-methylstyrene, α-methylstyrene dimer, vinylnaphthalene, isopropenylnaphthalene and bromostyrene.

These copolymerizable monomers may be used in one kind or being mixed in two or more kinds. The blending amount thereof may be suitably determined depending on the use. Generally, however, the copolymerizable monomers are blended in an amount of from 0.5 to 80 parts by weight per 100 parts by weight of the whole monomers (note: sum of the polyfunctional (meth)acrylate monomers and the copolymerizable monomers, which may further includes a polymerizable epoxy compound (described later) when it is used as an epoxy compound—hereinafter simply referred to as "whole monomers") in the photochromic polymerizable composition of the present invention. When the blending amount of the copolymerizable monomers is from 0.5 to 30 parts by weight per 100 parts by weight of the whole monomers, the obtained photochromic material exhibits improved heat resistance, which is particularly desirable.

<Component (b)>

Next, described below is a chromene compound which is the component (b) in the photochromic polymerizable composition of the present invention.

The chromene compound used in the present invention is represented by the above-mentioned general formula (1), general formula (3) or general formula (4).

In the preferred embodiment of the present invention, the chromene compound possesses a substituted or unsubstituted amino group on the benzochromene ring or on a substituent bonded to the benzochromene ring.

The chromene compound which is the component (b) arouses the above-mentioned problem of initial color when it is polymerized and cured upon being mixed with the above-mentioned polyfunctional (meth)acrylate monomer without being added with the compound (component (c)) that has an epoxy group in the molecules thereof. In the present invention, therefore, the component (b) and the component (c) must be used in combination.

In the chromene compound represented by the above-mentioned general formula (1), the group represented by the above-mentioned general formula (2),

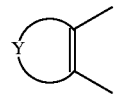

(2)

is a substituted or unsubstituted divalent aromatic hydrocarbon group or a substituted or unsubstituted divalent unsaturated heterocyclic group. Concrete examples of the aromatic hydrocarbon group include condensed rings having 1 to 4 benzene rings, such as benzene ring, naphthalene ring, phenanthrene ring and anthracene ring. As the unsaturated heterocyclic group, there can be exemplified a 5-membered ring containing oxygen atom, sulfur atom or nitrogen atom, a 6-membered ring, and heterocyclic groups having 4 to 14 carbon atoms in which the above ring is condensed with a benzene ring. Concrete examples of the unsaturated heterocyclic group include nitrogen-containing heterocyclic rings such as pyridine ring, quinoline ring, pyrroline ring and carbazole ring; oxygen-containing heterocyclic rings such as furan ring, benzofuran ring and dibenzofuran ring; and sulfur-containing heterocyclic rings such as thiophene ring, benzothiophene ring and dibenzothiophene ring.

The aromatic hydrocarbon ring or the unsaturated heterocyclic ring must have a substituted or unsubstituted amino group represented by the formula,

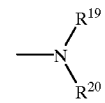

wherein R19 and R20 may be the same or different and are hydrogen atoms, substituted or unsubstituted alkyl groups having 1 to 10 carbon atoms, or substituted or unsubstituted aromatic hydrocarbon group having 6 to 10 carbon atoms or heterocyclic groups, or must have a nitrogen-containing heterocyclic group having, as a hetero atom, a nitrogen atom bonded to the group of the general formula (2).

As the substituents R19 and R20 for the substituted or unsubstituted amino group represented by the above formula, there can be used known groups such as hydrogen atoms, substituted or unsubstituted alkyl groups having 1 to 10 carbon atoms, substituted or unsubstituted aromatic hydrocarbon groups having 6 to 10 carbon atoms or heterocyclic rings without any limitation. Desirably, however, there are used alkyl groups, benzene rings or naphthalene rings having 1 to 4 carbon atoms. Here, the substituents R19 and R20 may be the same or different. Concrete examples of the amino group represented by the above formula include methylamino group, ethylamino group, propylamino group, isopropylamino group, dimethylamino group, diethylamino group, dipropylamino group, methylethylamino group, 2-hydroxyethylamino group, di(hydroxyethyl)amino group, di(cyanomethyl)amino group and diphenylamino group.

It is desired that the nitrogen-containing heterocyclic group having, as a hetero atom, a nitrogen atom that is bonded to the divalent group of the general formula (2), possesses 2 to 10 carbon atoms and, preferably, 2 to 6 carbon atoms to constitute the heterocyclic group. The ring may contain a hetero atom in addition to the nitrogen atom that is bonded to the benzochromene ring and may, preferably, contain an oxygen atom, a sulfur atom or a nitrogen atom without being limited to the hetero atom. As the aromatic hydrocarbon ring or the aromatic heterocyclic ring bonded to the heterocyclic group, there can be exemplified an aromatic hydrocarbon ring having 6 to 10 carbon atoms and an aromatic heterocyclic ring, such as benzene ring, thiophene ring and furan ring. As the substituted or unsubstituted heterocyclic ring having, as a hetero atom, a nitrogen atom that is bonded to the benzochromene ring or as the condensed heterocyclic ring in which the heterocyclic group is condensed with an aromatic hydrocarbon ring or an aromatic heterocyclic ring, there can be exemplified pyrrolidinyl group, piperidino group, hexamethyleneimino group, 2,2,6,6-tetramethylpiperidino group, morpholino group, 2,6-dimethylmorpholino group, N-methylpiperadinyl group, thiomorpholino group, indolyl group, 2-methylindolyl group, tetrahydroquinolyl group and aziridinyl group.

It is desired that the total number of the substituents, i.e., the total number of the substituted or unsubstituted amino groups bonded to the group of the above general formula (2) or the nitrogen-containing heterocyclic groups having, as a hetero atom, a nitrogen atom which is bonded to the group of the general formula (2), is at least one or more. From the standpoint of easy synthesis, however, it is desired that the total number of the substituents is from 1 to 3 and, preferably, from 1 to 2. When the number of the substituents is 2 or more, there may be bonded different substituted amino groups or different nitrogen-containing heterocyclic substituents.

Further, a known substituent may be substituted on the group of the general formula (2), such as alkyl group, aralkyl group, alkoxyl group, trifluoromethoxyl group, acyl group, alkoxycarbonyl group, cyano group, aryl group, acyloxyl group, nitro group, hydroxyl group or halogen atom.

The above-mentioned substituents will now be described.

Though there is no particular limitation, the above-mentioned alkyl group has generally from 1 to 10 carbon atoms and, particularly, from 1 to 4 carbon atoms from the standpoint of easy synthesis. Concrete examples of the alkyl group include methyl group, ethyl group, n-propyl group, isopropyl group, n-butyl group, sec-butyl group and t-butyl group.

Though there is no particular limitation, the above-mentioned aralkyl group has generally from 7 to 16 carbon atoms and, particularly, from 7 to 10 carbon atoms from the standpoint of easy synthesis. Concrete examples of the aralkyl group include benzyl group, phenylethyl group, phenylpropyl group and phenylbutyl group.

Though there is no particular limitation, the above-mentioned alkoxyl group is generally a substituted or unsubstituted alkyl group having 1 to 10 carbon atoms, a substituted or unsubstituted aryl group having 6 to 10 carbon atoms, or a hetero ring. Concrete examples of the alkoxyl group include methoxyl group, ethoxyl group, propoxyl group, isopropoxyl group, n-butoxyl group, t-butoxyl group, phenoxyl group and naphthoxyl group.

Though there is no particular limitation, the above-mentioned acyl group generally has from 2 to 15 carbon atoms and, particularly, from 2 to 7 carbon atoms from the standpoint of easy synthesis. Concrete examples of the acyl group include methylcarbonyl group, ethylcarbonyl group, propylcarbonyl group, isopropylcarbonyl group, n-butylcarbonyl group and t-butylcarbonyl group.

Though there is no particular limitation, the above-mentioned alkoxycarbonyl group generally has from 2 to 15 carbon atoms and, particularly, from 2 to 7 carbon atoms from the standpoint of easy synthesis. Concrete examples of the acyl group include methoxycarbonyl group, ethoxycarbonyl group, n-propoxycarbonyl group, isopropoxycarbonyl group, n-butoxycarbonyl group, and iso-butoxycarbonyl group.

Though there is no particular limitation, the above-mentioned aryl group has generally from 6 to 20 carbon atoms and, particularly, from 6 to 14 carbon atoms from the standpoint of easy synthesis. Concrete examples of the aryl group include phenyl group, naphthyl group, and tolyl group.

Though there is no particular limitation, the above-mentioned acyloxyl group has generally from 1 to 15 carbon atoms and, particularly, from 2 to 7 carbon atoms from the standpoint of easy synthesis. Concrete examples of the acyloxyl group include acetoxyl group, propionyloxyl group, benzoyloxyl group and (meth)acryloyloxyl group.

Though there is no particular limitation, concrete examples of the above-mentioned halogen atom that can be favorably used in the present invention include fluorine atom, chlorine atom, and bromine atom.

Though there is no particular limitation on the positions of the substituents and on the number of the substituents in the above-mentioned general formula (2), it is desired that the total number of the substituents is generally not larger than 3 and, preferably, not larger than 2 from the standpoint of easy synthesis.

In the above-mentioned general formula (1), hydrogen atoms, halogen atoms, alkyl groups or aralkyl groups denoted by R1 and R2 are those that are widely known and are used without any limitation. These halogen atoms, alkyl groups and aralkyl groups may be the same as those described above with reference to the general formula (2), and wherein R1 and R2 may be different from each other.

In the above-mentioned general formula (1), R3 and R4 are substituted or unsubstituted alkyl groups, substituted or unsubstituted aryl groups, or substituted or unsubstituted aromatic heterocyclic groups, and wherein R3 and R4 may be different from each other and may further be bonded together to form a ring.

As the above-mentioned alkyl group, a known one can be used without any limitation. Desirably, however, the alkyl group is the one having from 1 to 10 carbon atoms and, more preferably, from 1 to 6 carbon atoms. Concrete examples of the alkyl group include methyl group, ethyl group, propyl group, isopropyl group, cyclopropyl group, t-butyl group and cyclohexyl group.

As the above-mentioned aryl group, a known one can be used without any limitation. Desirably, however, an aryl group having 6 to 10 carbon atoms is used. Concrete examples of the aryl group include phenyl group, tolyl group, xylyl group and naphthyl group.

As the above-mentioned aromatic heterocyclic group, a known one can be used without any limitation. Desirably, however, there is used an aromatic heterocyclic group having 2 to 12 carbon atoms and having, as a hetero atom, nitrogen atom, sulfur atom or oxygen atom. Concrete examples of the aromatic heterocyclic group include furyl group, benzofuryl group, dibenzofuran cyclic group, thienyl group, benzothienyl group, dibenzothiophene cyclic group, N-methylpyrrolyl group, indolyl group, pyridinyl group, quinolyl group, isoquinolyl group and N-methylcarbazole group.

As the ring formed by the bonding of R3 and R4, there can be further exemplified norbornane ring, bicyclo[3.3.1] 9-nonane ring and adamantane ring in addition to those formed by bonding the above-mentioned alkyl groups, aryl groups or aromatic heterocyclic groups.

The alkyl groups, aryl groups or aromatic heterocyclic groups represented by R3 and R4 may have a known substituent. Preferred examples of the substituent include alkyl group, alkoxyl group, aralkyl group, aryl group, acyl group, alkoxycarbonyl group, substituted or unsubstituted amino group, acyloxyl group, nitro group, hydroxyl group, cyano group and halogen atom. These substituents may be the same as those substituents in the above-mentioned general formula (2). Though there is no particular limitation on the number of the substituents, it is desired that the number is generally from 0 to 4 and, preferably, from 0 to 3 from the standpoint of easy synthesis.

In the above-mentioned general formula (1), the chromene compound that can be particularly preferably used is represented by the following general formula (5),

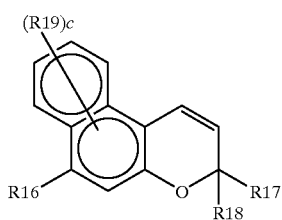

(5)

wherein R16 is a substituted or unsubstituted amino group or a nitrogen-containing heterocyclic group having, as a hetero atom, a nitrogen atom that is bonded to a benzochromene ring, R17 and R18 are alkyl groups, aryl groups or aromatic heterocyclic groups that may have a substituent, and wherein R17 and R18 may be different from each other and may further be bonded together to form a ring, R19 is a substituent at the fifth, seventh, eighth, ninth or tenth position of the benzochromene ring, and c is an integer of 0 to 3 representing the number of the substituents, and when c is not smaller than 2, the groups R1 may be different from each other.

The substituents in the above-mentioned general formula (5) may be the same as the substituents of the general formula (1).

In the chromene composition of the present invention, concrete examples of the chromene compound represented by the general formula (5) are as follows:

1) 6-morpholino-3,3-bis(3-fluoro-4-methoxyphenyl)-3H-benzo(f)chromene;
2) 6-morpholino-3-(4-methoxyphenyl)-3-(4-trifluoromethoxyphenyl)-3H-benzo(f)chromene;
3) 6-piperidino-3-methyl-3-(2-naphthyl)-3H-benzo(f)chromene;
4) 6-piperidino-3-methyl-3-phenyl-3H-benzo(f)chromene;
5) 6-morpholino-3,3-bis(4-methoxyphenyl)-3H-benzo(f)chromene;
6) 6-hexamethyleneimino-3-methyl-3-(4-methoxyphenyl)-3H-benzo(f)chromene;
7) 6-morpholino-3-(2-furyl)-3-methyl-3H-benzo(f)chromene;
8) 6-morpholino-3-(2-thienyl)-3-methyl-3H-benzo(f)chromene;
9) 6-morpholino-3-(2-benzofuryl)-3-methyl-3H-benzo(f)chromene;
10) 6-indolino-3-methyl-3-(2-naphthyl)-3H-benzo(f)chromene;
11) 3-(2-benzothienyl)-3-methyl-6-morpholino-3H-benzo(f)chromene; and
12) 6-hexamethyleneimino-3-methyl-3-(4-morpholinophenyl)-3H-benzo(f)chromene.

The chromene compounds represented by the general formula (5) can be used in one kind or being mixed together in two or more kinds depending upon the use.

In the above-mentioned general formula (3), R5 and R6 may be different from each other and are hydrogen atoms, halogen atoms, alkyl groups or aralkyl groups. These halogen atoms, alkyl groups or aralkyl groups may be the same groups as R1 and R2 of the general formula (1).

In the above-mentioned general formula (3), R7 and R8 may be the same or different and are aryl groups or aromatic heterocyclic groups that may have a substituent. These aryl groups and the aromatic heterocyclic groups may be the same groups as R3 and R4 of the general formula (1). Here, R7 and R8 may be different from each other and may, further, be bonded together to form a ring. Further, R7 and R8 possess, as a substituent, at least one or more substituted or unsubstituted amino groups or nitrogen-containing heterocyclic groups having, as a hetero atom, a nitrogen atom bonded to the aryl group, to the aromatic heterocyclic group or to the ring formed by the bonding of the groups R7 and R8. The substituted or unsubstituted amino group, or the nitrogen-containing heterocyclic group having, as a hetero atom, a nitrogen atom that is bonded, may be the same groups as those of the above-mentioned general formula (1). These substituents may be possessed in a number of one or more. Though there is no particular limitation in the upper limit, it is desired that the number of the substituents is from 1 to 4 and, preferably, from 1 to 2 from the standpoint of easy synthesis and photochromic property. The aryl group and the aromatic heterocyclic group may be substituted with a known substituent like those of the general formula (1).

In the above-mentioned general formula (3), R9 is a primary, secondary or tertiary alkyl group, a substituted or unsubstituted amino group, a known substituent having nitrogen atom as a hetero atom but excluding a nitrogen-containing heterocyclic group to which the nitrogen atom is bonded, or is a hydrogen atom.

Concrete examples of the group R9 include trifluoromethoxyl group, alkoxyl group, aralkyl group, acyl group, alkoxycarbonyl group, cyano group, aryl group, acyloxyl group, nitro group, hydroxyl group, halogen atom and hydrogen atom. These substitutes may be the same as those of the general formula (1).

In the general formula (3), R10 is a substituted or unsubstituted amino group or a known substituent having, as a hetero atom, a nitrogen atom that is bonded other than the nitrogen-containing heterocyclic group. Concrete examples of the substituent R10 include alkyl group, alkoxyl group, trifluoromethoxyl group, aralkyl group, acyl group, alkoxycarbonyl group, cyano group, aryl group, acyloxyl group, nitro group, hydroxyl group and halogen atom. These substituents may be the same as those of the general formula (1). Symbol a denotes the number of the groups R10 at the sixth, seventh, eighth, ninth and/or tenth position of the benzochromene ring. Though there is no particular limitation, a is from 0 to 3 and, preferably, from 0 to 2 from the standpoint of easy synthesis. These substituents may be different from each other. Among them, the preferred chromene compound represented by the general formula (3) is further expressed by the following general formula (6),

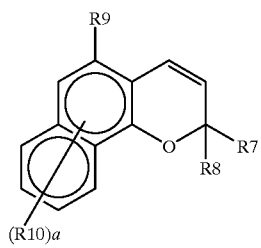

(6)

wherein R7 and R8 are aryl groups or aromatic heterocyclic groups that may have a substituent, and wherein R7 and R8 may be different from each other, R7 and R8 may be bonded to each other to form a ring, R7 and R8 have, as a substituent, at least one or more substituted or unsubstituted amino-groups or nitrogen-containing heterocyclic groups having, as a hetero atom, a nitrogen atom which is bonded to the aryl group, aromatic heterocyclic group or to the ring formed by the bonding of R7 and R8, R9 is a primary, secondary or tertiary alkyl group, a substituted or unsubstituted amino group, a substituent other than the nitrogen-containing heterocyclic group that has, as a hetero atom, a nitrogen atom that is bonded to the benzochromene ring, or a hydrogen atom, R10 is a substituted or unsubstituted amino group at the sixth, seventh, eighth, ninth and/or tenth position of the benzochromene ring, or a substituent other than the nitrogen-containing heterocyclic group having, as a hetero atom, a nitrogen atom bonded to the benzochromene ring, a is an integer of 0 to 2 representing the number of the substituents and, when a is 2, the groups R10 may be different from each other.

More preferred chromene compound is represented by the following general formula:

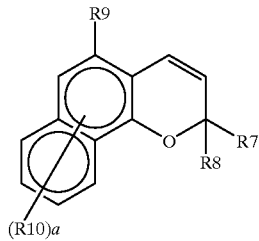

wherein R7 and R8 are phenyl groups, naphthyl groups, furyl groups, benzofuryl groups, dibenzofuran groups, thienyl groups, benzothienyl groups, dibenzothiophene cyclic groups, N-methylpyrrolyl groups, indolyl groups, indole cyclic groups, pyridinyl groups, quinolyl groups, isoquinolyl groups or N-methylcarbazole groups that may have a substituent, and wherein R7 and R8 may be different from each other, and R7 and R8 may have, as substituents, a total of 1 to 3 substituted or unsubstituted amino groups, or nitrogen-containing heterocyclic groups having, as a hetero atom, a nitrogen atom that is bonded to the aryl group or to the aromatic heterocyclic group, and R9, R10 and a are as defined in the above-mentioned general formula (6).

In the composition of the present invention, concrete examples of the preferred chromene compound represented by the general formula (6) are as follows:

1) 5-ethoxycarbonyl-6-methyl-2-(4-morpholinophenyl)-2-phenyl-2H-benzo(h)chromene;

2) 5-cyano-2-(4-fluorophenyl)-2-(4-morpholinophenyl)-2H-benzo(h)chromene;

3) 7,9-dimethoxy-2-(3-fluoro-4-methoxyphenyl)-2-(4-N,N-dimethylaminophenyl)-2H-benzo(h)chromene;

4) 5-bromo-2-(2-naphthyl)-2-(4-thiomorpholinophenyl)-2H-benzo(h)chromene;

5) 9-methoxy-2,2-bis(4-morpholinophenyl)-2H-benzo(h)chromene; and 6) 5-methoxy-2-(N-methyl-6-(1,2,3,4-tetrahydroquinolynyl)-2-(2-thienyl)-2H-benzo(h)chromene.

In the above-mentioned general formula (4), R11 and R12 may be different from each other and are hydrogen atoms, halogen atoms, alkyl groups or aralkyl groups. These halogen atoms, alkyl groups and aralkyl groups may be the same as those of R1 and R2 of the general formula (1).

In the above-mentioned general formula (4), R13 and R14 are aryl groups or aromatic heterocyclic groups that may have a substituent, and wherein R13 and R14 may be different from each other, and may be bonded to each other to form a ring, and R13 and R14 have, as a substituent, at least one or more substituted or unsubstituted amino groups or nitrogen-containing heterocyclic groups having, as a hetero atom, a nitrogen atom that is bonded to the aryl group, aromatic heterocyclic group or to the ring formed by the bonding of the groups R13 and R14.

The above-mentioned aryl groups, aromatic heterocyclic groups, substituted or unsubstituted amino groups substituted for these groups, and nitrogen-containing heterocyclic groups having, as a hetero atom, a nitrogen atom that is bonded to the aryl group or to the aromatic heterocyclic group, may be those of the above-mentioned general formula (1).

In the above-mentioned general formula (4), R15 is a substituted or unsubstituted amino group or a known substituent other than the nitrogen-containing heterocyclic group having, as a hetero atom, a nitrogen atom that is bonded. These known substituents are the same as the substituents represented by R10 in the general formula (3). Symbol b denotes the number of the groups R15 at the fifth, sixth, seventh, eighth, ninth and/or tenth position of the benzochromene ring. Though there is no particular limitation, b is 0 to 3 and, preferably, 0 to 2 from the standpoint of easy synthesis.

In the chromene compound represented by the above-mentioned general formula (4), a preferred chromene compound is expressed by the following general formula (7),

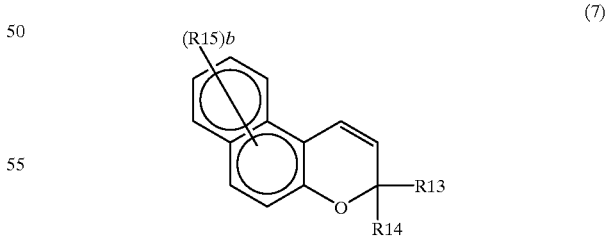

(7)

wherein R13 and R14 are aryl groups or aromatic heterocyclic groups that may have a substituent, and wherein R13 and R14 may be different from each other, and may be bonded together to form a ring, and R13 and R14 have, as substituents, at least one or more substituted or unsubstituted amino groups, or nitrogen-containing heterocyclic groups having, as a hetero atom, a nitrogen atom bonded to the aryl group, aromatic heterocyclic group or to the ring formed by the bonding of the groups R13 and R14, R15 is a substituted or unsubstituted amino group at the fifth, sixth, seventh, eighth, ninth and/or tenth position of the benzochromene ring, or a substituent other than the nitrogen-containing heterocyclic group having, as a hetero atom, a nitrogen atom bonded to the benzochromene ring, and b is an integer of 0 to 2 representing the number of the substituents and, when b is 2, the groups R15 may be different from each other.

As a preferred chromene compound, furthermore, there can be exemplified the one represented by the following general formula,

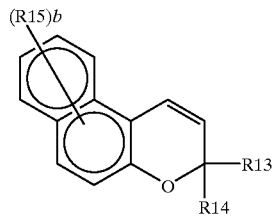

wherein R13 and R14 are phenyl groups, naphthyl groups, furyl groups, benzofuryl groups, dibenzofuran cyclic groups, thienyl groups, benzothienyl groups, dibenzothiophene ring groups, N-methylpyrrolyl groups, indolyl groups, indole cyclic groups, pyridinyl groups, quinolyl groups, isoquinolyl groups or N methylcarbazole groups that may have a substituent, and wherein R13 and R14 have, as substituents, a total of 1 to 3 substituted or unsubstituted amino groups or nitrogen-containing heterocyclic groups having, as a hetero atom, a nitrogen atom bonded to the aryl group or the aromatic heterocyclic group, and R15 and b are as defined in the above-mentioned general formula (7).

In the composition of the present invention, concrete examples of the preferred chromene compound represented by the general formula (7) are as follows:

1) 3-(2-furyl)-3-(4-morpholinophenyl)-3H-benzo(f) chromene;
2) 3-(4-N,N-diethylaminophenyl)-3-(3,4-dimethoxyphenyl)-3H-benzo(f)chromene;
3) 3-(4-morpholinophenyl)-3-(1-naphthyl)-3H-benzo(f) chromene;
4) 3-(3-chlorophenyl)-8-methoxy-(4-piperidino-1-naphthyl)-3H-benzo(f)chromene;
5) 3-(2-fluoro-4-morpholinophenyl)-3-(2-thienyl)-3H-benzo(f)chromene;
6) 8-bromo-3-(3-fluoro-2-naphthyl)-3-(4-(N-piperazino) phenyl)-3H-benzo(f)chromene; and
7) 3-(2-cyanophenyl)-8-morpholino-3-(4-ethoxyphenyl)-3H-benzo(f)chromene.

There is no particular limitation on the amount of blending the chromene compounds represented by the above-mentioned general formulas (1), (3) and (4) in the photochromic polymerizable composition of the present invention, and the amount can be suitably determined depending upon the use. When the photochromic polymerizable composition of the present invention is used for, for example, optical lenses such as lenses of spectacles, the chromene compound is generally blended in an amount of from 0.001 to 10 parts by weight per 100 parts by weight of the whole monomers.

Generally, the color density of the cured product obtained by curing the photochromic polymerizable composition of the present invention varies in proportion to the amount of blending to some extent. When the chromene compound is blended in excess amounts, however, the color density does not increase in proportion to the amount of blending but rather the photochromism resistance is deteriorated. Therefore, the amount of blending the chromene compound is from 0.01 to 5 parts by weight and, preferably, from 0.01 to 1 part by weight per 100 parts by weight of the whole monomers.

<Component (c)>

Next, described below is the epoxy compound which is the component (c) in the photochromic polymerizable composition of the present invention.

Any known epoxy compound can be used in the present invention without limitation provided it has at least one or more epoxy groups in the molecules. For example, there can be used a reaction product of an epichlorohydrin with an alcoholic hydroxyl group-containing compound of monohydric, dihydric or trihydric alcohol or with a phenolic hydroxyl group-containing compound such as phenol or hydroquinone; and a reaction product of an epichlorohydrin with a carboxylic acid such as benzoic acid or terephthalic acid.

In the present invention, however, it is desired to use an epoxy compound having at least one or more unsaturated double bonds in the molecules on account of the following reasons. That is, when an epoxy compound having at least one or more unsaturated double bonds in the molecules is used, the epoxy compound is fixed to a matrix by being copolymerized with other monomer such as polyfunctional (meth)acrylate monomer at the time of polymerizing and curing the photochromic polymerizable composition of the present invention, little impairing the properties of the obtained cured product.

As the unsaturated double bond contained in the epoxy compound, there can be exemplified a vinyl group, an allyl group and a (meth)acryloyl group. To obtain favorable photochromic properties, however, it is desired to use the (meth)acryloyl group.

Among the epoxy compounds that can be used in the present invention, a preferred epoxy compound without having an unsaturated double bond in the molecules is expressed by the following formula,

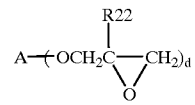

wherein A is a residue of an alcoholic hydroxyl group-containing compound having a value d, a residue of a phenolic hydroxyl group-containing compound having a value d, or a residue of carboxylic acid having a value d, R22 is a hydrogen atom or a methyl group, and d is an integer of 1 to 4.

In the above-mentioned formula representing the epoxy compound without unsaturated double bond, d is 1 or 2 and, when d is 1, A is an alkyl group that may be substituted with a hydroxyl group and having 2 to 20 carbon atoms, a group represented by —(OR)e—OH (wherein R is an alkylene group having 2 to 4 carbon atoms, and e is an integer of from 1 to 20), a cycloalkyl group that may be substituted with a hydroxyl group and having 6 to 7 carbon atoms, a phenyl group that may be substituted with a hydroxyl group, or a benzoyl group that may be substituted with a carboxyl group, and, when d is 2, A is an alkylene group that may be substituted with a hydroxyl group and having 2 to 20 carbon atoms, a group represented by —(OR)e—(wherein R is an alkylene group having 2 to 4 carbon atoms, and e is an integer of from 1 to 20), a cycloalkylene group that may be substituted with a hydroxyl group and having 6 to 7 carbon atoms, a phenylene group that may be substituted with a hydroxyl group, a phthaloyl group, an isophthaloyl group, a terephthaloyl group, or a group represented by the following formula,

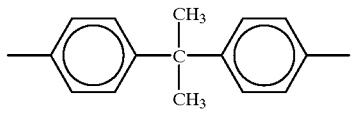

Concrete examples of the compound of the above-mentioned formula include ethylene glycol glycidyl ether, propylene glycol glycidyl ether, glycerol polyglycidyl ether, diglycerol polyglycidyl ether, sorbitol polyglycidyl ether, butyl glycidyl ether, phenyl glycidyl ether, polyethylene glycol diglycidyl ether, polypropylene glycol diglycidyl ether, 1,6-hexanediol diglycidyl ether, propylene oxide adduct of bisphenol A or hydrogenated bisphenol A, glycidyl terephthalate ester, spiroglycol diglycidyl ether, and hydroquinone diglycidyl ether.

Among the epoxy compounds, an epoxy compound having one or more unsaturated double bonds in the molecules and that can be particularly preferably used in the present invention, is expressed by the following formula,

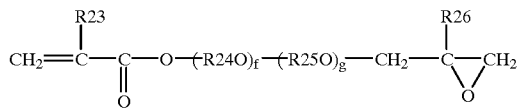

wherein R23 and R26 are, independently of each other, hydrogen atoms or methyl groups, R24 and R25 may be the same or different and are alkylene groups that may be substituted with a hydroxyl group and having 1 to 4 carbon atoms, or groups represented by the following formula,

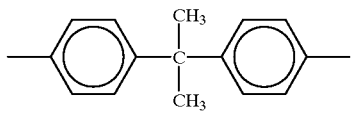

and f and g are, independently of each other, 0 or 1.

Examples of the alkylene group denoted by R24 and R25 in the above formula include methylene group, ethylene group, propylene group, isopropylene group, butylene group, isobutylene group, trimethylene group and tetramethylene group. These groups may be substituted with a hydroxyl group.

Concrete examples of the compound that can be preferably used as a compound having at least one epoxy group and a radically polymerizable group in the molecules include acrylic ester compounds and methacrylic ester compounds, such as glycidyl (meth)acrylate, β-methylglycidyl (meth)acrylate, bisphenol A-monoglycidyl ether (meth)acrylate, 4-glycidyloxybutyl (meth)acrylate, 3-(glycidyl-2-oxyethoxy)-2-hydroxypropyl (meth)acrylate, 3-(glycidyloxy-2-isopropyloxy)-2-hydroxypropyl (meth)acrylate, and 3-glycidyloxy-2-hydroxypropyloxy)-2-hydroxypropyl (meth)acrylate. Among them, the glycidyl (meth)acrylate is preferred from the standpoint of resistance in the photochromic action.

The amount of blending the epoxy compound in the photochromic polymerizable composition of the present invention may be suitably determined depending upon the kinds and the blending ratios of the polyfunctional (meth) acrylate monomer and the chromene compound that are used, and the kind of the epoxy compound that is used. When a polyfunctional (meth)acrylate monomer that is usually placed in the market is used, the epoxy compound is used in an amount of not smaller than 1 part by weight and, preferably, from 1 to 30 parts by weight per 100 parts by weight of the whole monomers irrespective of the amounts of the chromene compound and the epoxy compound that are used, thereby suppressing the problem of initial color and offering photochromism resistance to a practicable degree. When the epoxy compound without unsaturated double bond is used, however, the curing tends to be delayed when the amount of its use is too large. When the epoxy compound without unsaturated double bond is to be used, therefore, its amount should be from 1 to 10 parts by weight and, preferably, from 1 to 5 parts by weight per 100 parts by weight of the whole monomers.

The thus obtained photochromic polymerizable composition can be polymerized and cured depending on the object.

<Component (d)>

Described below is the polymerization initiator which is the component (d) in the photochromic polymerizable composition of the present invention.

Any known radical polymerization initiator can be used as a polymerization initiator without limitation. Representative examples include diallyl peroxides such as benzoyl peroxide, p-chlorobenzoyl peroxide, decanoyl peroxide, lauroyl peroxide and acetyl peroxide; peroxy esters such as t-butylperoxy-2-ethyl hexanate, t-butylperoxy neodecanate, cumylperoxy neodecanate, t-butylperoxy benzoate, t-butylperoxy isobutylate, and 1,1,3,3-tetramethylbutylperoxy-2-ethyl hexanate; percarbonates such as diisopropylperoxy carbonate, and di-sec-butylperoxy dicarbonate; and azo compounds such as azobisisobutylonitrile and the like. As the photopolymerization catalyst, there can be used acetophenone compounds such as 1-phenyl-2-hydroxy-2-methylpropane-1-on, 1-hydroxycyclohexylphenyl ketone, and 1-(4-isopropylphenyl)-2-hydroxy-2-methylpropane-1-on; α-carbonyl compounds such as 1,2-diphenylethane dione, and methylphenyl glyoxylate; and acylphosphine oxide compounds such as 2,6-dimethylbenzoyldiphenylphosphine oxide, 2,4,6-trimethylbenzoyldiphenyl phosphinoxide, 2,6-dichlorobenzoyldiphenyl phosphinoxide, and 2,6-dimethoxybenzoyldiphenyl phosphinoxide. These polymerization initiators may be used alone or may be used in two or more kinds at any ratio depending on the monomer that is used. Further, the heat polymerization catalyst and the photopolymerization catalyst may be used in combination. When the photopolymerization catalyst is used, a known polymerization promoter such as tertiary amine or the like may be used in combination.

The amount of the radical polymerization initiator varies depending upon the polymerization conditions, kind of the initiator and composition of the radically polymerizable monomer, and cannot be exclusively determined but is, generally, from 0.001 to 10 parts by weight and, preferably, from 0.01 to 5 parts by weight per 100 parts by weight of the whole polymerizable monomers.

<Other Components>

The photochromic polymerizable composition of the present invention can be blended with various additives depending on the use of the photochromic material that is obtained by polymerizing and curing the polymerizable composition within a range in which the curing is not impaired, in order to improve properties.

For example, the chromene compound used in the present invention exhibits a color tone of yellow to violet. It is, however, allowable to use the chromene compound in combination with other known photochromic compounds to obtain a photochromic composition that develops a neutral tint such as grey, amber, brown, etc. that is generally preferred for the photochromic lenses. There is no particular limitation on the combination with other photochromic compounds; i.e., a known photochromic compound can be used, such as oxazine compound, fulgimide compound and/or known chromene compound (hereinafter also referred to as "other known chromene compounds") in addition to the chromene compound used in the present invention.

As the fulgimide compound and oxazine compound, there can be used known compounds taught in, for example, U.S. Pat. Nos. 4,882,438, 4,960,678, 5,130,058, 4,913,544 and EP 0600669.

As the oxazine compound, there can be used without limitation any known compound having a spirooxazine skeleton and photochromic property, such as an oxazine compound represented by the following formula,

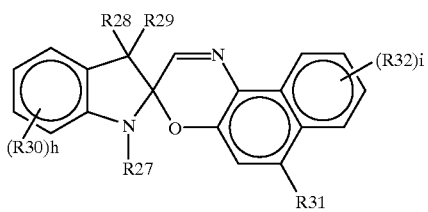

wherein R27 is an alkyl group that may be branched, R28 and R29 are alkyl groups which may be different from each other, and wherein R28 and R29 may be bonded to each other to form a cycloalkane ring, R30 and R31 are alkyl groups, alkoxyl groups or halogen atoms, R32 is a hydrogen atom, a substituted or unsubstituted heterocyclic group having, as, a hetero atom, a nitrogen atom that is bonded to a benzochromene ring, or a condensed heterocyclic group in which the heterocyclic group is condensed with an aromatic hydrocarbon ring or with an aromatic heterocyclic ring, h is an integer of 0 to 2 representing the number of the substituents R30, and i is an integer of 0 to 2 representing the number of the substituents R32.

There is no particular limitation on the alkyl groups denoted by R27, R28 and R29 in the above-mentioned formula, and there can be used those alkyl groups having 1 to 5 carbon atoms, such as methyl group, ethyl group, isopropyl group, n-propyl group, n-butyl group, isobutyl group and neopentyl group. As the cycloalkane ring formed by the bonding of the groups R28 and R29, there can be exemplified cyclopropane ring, cyclobutane ring, cyclopentane ring, cyclohexane ring and cycloheptane ring.

There is no particular limitation on the alkoxyl group denoted by R30 and R31 in the above-mentioned formula, and there can be used those alkoxyl groups having 1 to 4 carbon atoms, such as methoxyl group, ethoxyl group, n-propoxyl group, n-butoxyl group, isobutoxyl group and t-butoxyl group.

There is no particular limitation on the halogen atoms represented by R30 and R31 in the above-mentioned formula, and there can be used, for example, fluorine atom, chlorine atom or bromine atom.

There is no particular limitation on the substituted or unsubstituted heterocyclic group denoted by R32 in the above-mentioned formula having, as a hetero atom, a nitrogen atom that is bonded to the benzochromene ring, and there can be generally used those groups having 2 to 10 carbon atoms constituting the heterocyclic group. The ring may contain a hetero atom in addition to the nitrogen atom bonded to the benzochromene ring. Though there is no particular limitation, the hetero atom may be an oxygen atom, a sulfur atom or a nitrogen atom. As the aromatic hydrocarbon ring or the aromatic heterocyclic ring condensed with the heterocyclic group to form a condensed heterocyclic group, there can be exemplified an aromatic hydrocarbon ring and an aromatic heterocyclic ring having 6 to 10 carbon atoms, such as benzene ring, thiophene ring, furan ring and, particularly, benzene ring.

As the substituent for the heterocyclic group which has, as a hetero atom, a nitrogen atom that is bonded to the benzochromene ring, or for the condensed heterocyclic group in which the heterocyclic group is condensed with an aromatic hydrocarbon ring or an aromatic heterocyclic ring, there can be used any known substituent without limitation. From the standpoint of easy synthesis, however, there are used alkyl groups such as methyl group, ethyl group, isopropyl group, n-propyl group and t-butyl group; alkoxyl groups such as methoxyl group, ethoxyl group, isopropoxyl group, n-propoxyl group and t-butoxyl group; and halogen atoms such as fluorine atom, chlorine atom and bromine atom.

Concrete examples of the substituted or unsubstituted heterocyclic ring having, as a hetero atom, a nitrogen atom bonded to the benzochromene ring, or concrete examples of the condensed heterocyclic group in which the heterocyclic group is condensed with the aromatic hydrocarbon ring or the aromatic heterocyclic ring, include pyrrolidinyl group, piperidino group, hexamethyleneimino group, 2,2,6,6-tetramethylpiperidino group, morpholino group, 2,6-dimethylmorpholino group, N-methylpiperadinyl group, thiomorpholino group, indolyl group, 2-methylindolyl group, tetrahydroquinolyl group and aziridinyl group.

Concrete examples of the oxazine compound that can be favorably used in the present invention are as follows:

1) 1',5'-dimethyl-6'-fluoro-6"-morpholinodispiro (cyclohexane-1,3'-(3H)indole-2'-(2H), 3"-(3H)naphtho (3,2-a)(1,4)oxazine;

2) 6'-fluoro-1'-methyl-8"-methoxy-6"-piperidinodispiro (cyclohexane-1,3'-(3H)indole-2'-(2H), 3"-(3H)naphtho (3,2-a)(1,4)oxazine;

3) 6'-fluoro-6"-morpholino-1'-neopentyldispiro (cyclohexane-1,3'-(3H)indole-2-(2H), 3"-(3H)naphtho (3,2-a)(1,4)oxazine;

4) 5',7'-difluoro-1'-methyl-6"-morpholinodispiro (cyclohexane-1,3'-(3H)indole-2'-(2H), 3"-(3H)naphtho (3,2-a)(1,4)oxazine;

5) 6'-fluoro-1'-(2-methyl)propyl-6"-morpholinodispiro (cyclohexane-1,3'-(3H)indole-2'-(2H), 3"-(3H)naphtho (3,2-a)(1,4)oxazine;

6) 6"-indolino-1',5'-dimethyl-6'-fluorodispiro (cyclohexane-1,3'-(3H)indole-2'-(2H), 3"-(3H)naphtho (3,2-a)(1,4)oxazine; and 7) 6'-methyl-6'-fluoro-1-(2-methyl)propyldispiro (cyclohexane-1,3'-(3H)indole-2'-(2H),3"-(3H)naphtho (3,2-a)(1,4)oxazine.

The above-mentioned oxazine compounds may be used in a single kind or being mixed together in two or more kinds at any ratio.

As the above-mentioned fulgimide compound of the present invention, there can be used, without limitation, any known compound having a fulgimide skeleton and photochromic property, such as a fulgimide compound represented by the following formula,

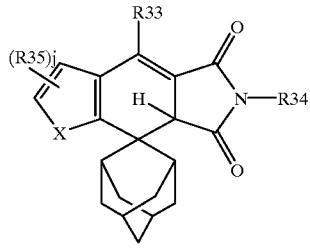

wherein R33 is an alkyl group, a cycloalkyl group, an aryl group or a heteroaryl group, R34 is a cyano group, a cyanomethyl group, or an m-cyanophenyl group, R35 is a hydrogen atom, an alkyl group, an aryl group which may be substituted or a halogen atom, X is a sulfur atom or an oxygen atom, j is an integer of 0 to 2 representing the number of the substituents R35, and when j is 2, the groups R35 may be different from each other.

Though there is no particular limitation on the alkyl groups denoted by R33 and R35 in the above-mentioned general formula, there can be used those alkyl groups having 1 to 4 carbon atoms, such as methyl group, ethyl group, n-propyl group, isopropyl group, n-butyl group and isobutyl group.

Though there is no particular limitation on the cycloalkyl group denoted by R33 in the above-mentioned general formula, there can be used those cycloalkyl groups having 3 to 6 carbon atoms, such as cyclopropyl group, cyclobutyl group, cyclopentyl group and cyclohexyl group.

Though there is no particular limitation on the aryl group denoted by R33 in the above-mentioned general formula, there can be generally used a phenyl group. Any known substituent can be used for the aryl group without limitation. Preferred examples are alkoxyl groups such as methoxyl group and ethoxyl group; alkyl groups having 1 to 4 carbon atoms, such as methyl group, ethyl group, isopropyl group, n-butyl group and t-butyl group; halogen atoms such as fluorine atom, chlorine atom and bromine atom; cyano group; and trifluoromethyl group. There is no particular limitation on the number of the substituents on the aryl group. From the standpoint of easy synthesis, however, the number of the substituents :s from 0 to 3 and, preferably, from 0 to 2.

Though there is no particular limitation on the heteroaryl group denoted by R33 in the above-mentioned general formula, there are generally used those heteroaryl groups such as thiophene ring, furan ring, benzothiophene ring and benzofuran ring. As the substituent for the heteroaryl group, a known substituent can be used without limitation. Examples include alkoxyl groups such as methoxyl group and ethoxyl group; alkyl groups having 1 to 4 carbon atoms, such as methyl group, ethyl group, isopropyl group, n-butyl group and t-butyl group; halogen atoms such as fluorine atom, chlorine atom and bromine atom; cyano group; and trifluoroethyl group. There is no particular limitation on the number of the substituents on the aryl group. From the standpoint of easy synthesis, however, the number of the substituents is from 0 to 3 and, preferably, from 0 to 2.

Though there is no particular limitation on the aryl group denoted by R35 in the above-mentioned general formula, there can be generally used a phenyl group. Any known substituent can be used for the aryl group without limitation. Preferred examples are alkoxyl groups such as methoxyl group, ethoxyl group, n-propoxyl group, isopropoxyl group, n-butoxyl group, isobutoxyl group and t-butoxyl group; alkyl groups having 1 to 4 carbon atoms, such as methyl group, ethyl group, isopropyl group, n-butyl group, isobutyl group and t-butyl group; halogen atoms such as fluorine atom, chlorine atom and bromine atom; cyano group; and trifluoromethyl group. There is no particular limitation on the number of the substituents on the aryl group. From the standpoint of easy synthesis, however, the number of the substituents is from 0 to 3 and, preferably, from 0 to 2.

Concrete examples of the fulgimide compound that can be favorably used in the present invention are as follows:

1) N-cyanomethyl-6,7-dihydro-4-methyl-2-phenylspiro(5,6-benzo[b]thiophenedicarboxyimide-7,2-tricyclo[3.3.1.1$^{3,7}$]decane);
2) N-cyanomethyl-6,7-dihydro-2-(4'-methoxyphenyl)-4-methylspiro(5,6-benzo[b]thiophenedicarboxyimide-7,2-tricyclo[3.3.1.1$^{3,7}$]decane);
3) N-cyano-6,7-dihydro-4-methyl-2-phenylspiro(5,6-benzo[b]thiophenedicarboxyimide-7,2-tricyclo[3.3.1.1$^{3,7}$]decane);
4) N-cyano-6,7-dihydro-4-methylspiro(5,6-benzo[b]furandicarboxyimide-7,2-tricyclo[3.3.1.1$^{3,7}$]decane);
5) N-cyano-4-cyclopropyl-6,7-dihydrospiro(5,6-benzo[b]furandicarboxyimide-7,2-tricyclo[3.3.1.1$^{3,7}$]decane);
6) N-cyano-6,7-dihydro-4-methylspiro(5,6-benzo[b]thiophenedicarboxyimide-7,2-tricyclo[3.3.1.1$^{3,7}$]decane);
7) N-cyanomethyl-4-cyclopropyl-6,7-dihydrospiro(5,6-benzo[b]thiophenedicarboxyimide-7,2-tricyclo[3.3.1.1$^{3,7}$]decane);
8) N-cyanomethyl-4-cyclopropyl-6,7-dihydro-2-(4'-methoxyphenylspiro(5,6-benzo[b]thiophenedicarboxyimide-7,2-tricyclo[3.3.1.1$^{3,7}$]decane);
9) N-cyanomethyl-4-cyclopropyl-6,7-dihydro-2-phenylspiro(5,6-benzo[b]thiophenedicarboxyimide-7,2-tricyclo[3.3.1.1$^{3,7}$]decane); and
10) N-(3'-cyanophenyl)-6,7-dihydro-4-methyl-2-(4'-methoxyphenyl)spirobenzothiophenecarboxyimide-7,2'-tricyclo[3.3.1.1$^{3,7}$]decane.

The above-mentioned fulgimide compounds may be used in a single kind or being mixed in two or more kinds at any ratio.

In addition to the chromene compound used in the present invention, there can be used any other known chromene compounds having photochromic property.

In the present invention, the mixing ratios of the oxazine compounds, fulgimide compounds and other known chromene compounds are not particularly limited but may be suitably determined by taking the properties of the photochromic compounds into consideration. When the oxazine compounds, fulgimide compounds and/or other known chromene compounds are to be added to the photochromic polymerizable composition of the present invention, the amount of their addition is usually from 0.001 to 10 parts by weight and, preferably, from 0.01 to 1 part by weight per 100 parts by weight of the whole monomers.

Further, an ultraviolet ray stabilizer may be added to the photochromic polymerizable composition of the present invention. When the ultraviolet ray stabilizer is added, the photochromic resistance can be further improved. When the fulgimide compound is used in combination, in particular, the light resistance is improved. When it is attempted to obtain a neutral tint by using the oxazine compound and the fulgimide compound in combination, therefore, it is made possible to prevent a change in the tone of neutral tint with the passage of time.

A known ultraviolet ray stabilizer can be used without limitation, such as hindered amine photostabilizer, hindered phenol photostabilizer, sulfur-type antioxidizing agent, and phosphorous ester-type photostabilizer.

There is no particular limitation on the amount of using the ultraviolet ray stabilizer. Usually, however, the amount of use thereof is from 0.01 to 5 parts by weight and, preferably, from 0.02 to 1 part by weight per 100 parts by weight of the whole monomers.

As required, further, there can be added various additives such as benzotriazole-type ultraviolet ray absorbing agent or benzophenone-type ultraviolet ray absorbing agent, antioxidizing agent, coloring-preventing agent, antistatic agent, phosphorescent dye, pigment and perfume.

<Polymerization and Curing of Polymerizable Composition>

Next, described below is a method of obtaining the photochromic material of the present invention by polymerizing and curing the photochromic polymerizable composition of the present invention.

According to the present invention, there is no particular limitation on the polymerizing method of obtaining a polymer from the photochromic polymerizable composition, and any known radical polymerization method can be employed. The polymerization is accomplished by using radical polymerization initiators such as various peroxides and azo compounds, or by the irradiation with ultraviolet rays, α-rays, β-rays or γ-rays, or by using both of them. A representative polymerization method will be a cast polymerization in which the photochromic polymerizable composition of the present invention containing a radical polymerization initiator is poured into a mold supported by an elastomer gasket or a spacer, polymerized in a heating furnace or by the irradiation with ultraviolet rays or visible light, and is removed.

Among the polymerization conditions, the polymerization temperature varies depending on the kind of the polymerizable monomer and the radical polymerization initiator and cannot be exclusively determined. In general, however, the polymerization starts with a relatively low temperature. The temperature is then gradually raised and at the end of the polymerization, the photochromic polymerizable composition is cured, establishing the so-called tapered two-stage polymerization. Like the temperature, the polymerization time varies depending on various factors and it is desired to determine an optimum time depending on the conditions. In general, however, it is desired that the polymerization is completed in 2 to 40 hours.

<Photochromic Material>

The thus obtained photochromic material of the present invention exhibits favorable photochromic properties even in a polymer. The polymer can be advantageously used for such applications as photochromic glasses and photochromic lenses.

The photochromic material of the present invention can be used over a wide range, such as a variety of memory materials to substitute for silver salt photosensitive material, copying material, photosensitive material for printing, storage material for cathode-ray tubes, photosensitive material for a laser beam, and photosensitive material for holography. The photochromic material of the present invention can be further used for photochromic lenses, optical fibers, as a display material, as an actinometer, and for ornamental use.

When used, for example, for the photochromic lenses, there can be employed, without limitation, a method which makes it possible to obtain a uniform dimming property. Concretely speaking, there can be employed a method by which a polymer film in which the photochromic material of the invention is homogeneously dispersed is sandwiched in the lens, and a method by which the chromene compound of the invention is dispersed in the above-mentioned polymerizable monomer and is polymerized according to a predetermined method.

EXAMPLES

The present invention will be described in further detail by way of Examples to which only, however, the invention is in no way limited.

Described below are abbreviations of the compounds used in Examples and in Comparative Examples.

1. Epoxy compounds.
    GMA: glycidyl methacrylate
    GA: glycidyl acrylate
    MGMA: β-methylglycidyl methacrylate
    MGA: β-methylglycidyl acrylate
    BPMGMA: bisphenol A-monoglycidylether methacrylate
    GBMA: 4-glycidyloxybutyl methacrylate
    GEHPMA: 3-(glycidyl-2-oxyethoxy)-2-hydroxypropyl methacrylate
    GIHPA: 3-(glycidyloxy-1-isopropyloxy)-2-hydroxypropyl acrylate
    EGGE: ethylene glycolglycidyl ether
    PGGE: propylene glycolglycidyl ether
    FDGE: terephthalic acid diglycidyl ether
    BGE: butylglicidyl ether
    HDGE: 1,6-hexanediolglicidyl ether
2. Polyfunctional (meth)acrylate monomers.
    3G: triethylene glycol dimethacrylate (trade name: NK Ester 3G, produced by Shin-Nakamura Kagaku Co.)
    4G: tetraethylene glycol dimethacrylate (trade name: NK Ester 4G, produced by Shin-Nakamura Kagaku Co.)
    3PG: tripropylene glycol dimethacrylate (trade name: NK Ester 3PG, produced by Shin-Nakamura Kagaku Co.)
    BP-2EM: 2,2-bis(4-methacryloyloxypolyethoxyphenyl) propane(a mixture having an average mole number of an ethylene oxide chain of 2.2)(trade name: Light Ester BP-2EM, produced by Kyoeisha Kagaku Co.)
    BR-MA: 2,2-bis(3,5-dibromo-4-methacryloyloxyethoxyphenyl) propane (trade name: Light Ester BR-MA, produced by Kyoeisha Kagaku Co.)
    TEGDMA: triethylene glycol dimethacrylate (trade name: TEGDMA, produced by Mitsubishi Gas Kagaku Co.)
    3EG: triethylene glycol dimethacrylate (trade name: Light Ester 3EG, produced by Kyoeisha Kagaku Co.)
    PRO-631: 2,2-bis(4-methacryloyloxypolyethoxyphenyl) propane (trade name: PRO-631, produced by Sertomar Co.)
3. Copolymerizable monomers.
    MMA: methyl methacrylate
    MS: α-methylstyrene
    MSD: α-methylstyrene dimer BzMA: benzyl methacrylate HEMA: 2-hydroxyethyl methacrylate 4. Radical Polymerization Initiator.

Perbutyl ND: t-butylperoxy neodecanate (trade name: Perbutyl ND, produced by Nippon Yushi Co.)

5. Chromene compounds.

C1) 3,3-bis (3-fluoro-4-methoxyphenyl) -6-morpholino-3H-benzo(f)chromene;

C2) 3,3-bis(4-methoxyphenyl)-6-morpholino-3H-benzo(f)chromene;

C3) 3-(4-methoxyphenyl)-3-(3-trifluoromethyl-4-methoxyphenyl)-6-piperidino-3H-benzo(f)chromene;

C4) 3, 3-bis (4-methoxyphenyl) -6-N-methylpiperadino-3H-benzo(f)chromene;

C5) 3-(2-furyl)-3-methyl-6-morpholino- 3H-benzo(f)chromene;

C6) 3-methyl-3-(2-naphthyl)-6-morpholino-3H-benzo(f)chromene;

C8) 6-morpholinospiro(fluorene-9,3'-3H-benzo(f)chromene);

C9) 3-(2-furyl)-3-(4-morpholinophenyl)-3H-benzo(f)chromene;

C10) 3-(4-N,N-diethylaminophenyl)-3-(3,4-dimethoxyphenyl)-3H-benzo(f)chromene;

C11) 3-(4-morpholinophenyl)-3-(1-naphthyl)-3H-benzo(f)chromene;

C12) 3-(3-chlorophenyl)-8-methoxy-3-(4-piperidino-1-naphthyl)-3H-benzo(f)chromene;

C13) 3-(2-fluoro-4-morpholinophenyl)-3-(2-thienyl)-3H-benzo(f)chromene;

C14) 8-bromo-3-(3-fluoro-2-naphthyl)-3-(4-(N-methylpiperadino)phenyl)-3H-benzo(f)chromene;

C15) 3-(2-cyanophenyl)-8-morpholino-3-(4-ethoxyphenyl)-3H-benzo(f)chromene;

C16) 6-indolino-3-methyl-3-(2-naphthyl)-3H-benzo(f)chromene;

C17) 3-(2-benzofuryl)-3-methyl-6-morpholino-3H-benzo(f)chromene;

C18) 6-hexamethyleneimino-3-methyl-3-(4-morpholinophenyl)-3H-benzo(f)chromene;

C19) 5-ethoxycarbonyl-6-methyl-2-(4-morpholinophenyl)-2-methoxyphenyl-2H-benzo(h)chromene;

C20) 5-cyano-2-(4-fluorophenyl)-2-((4-morpholinophenyl-2H-benzo(h)chromene;

C21) 7,9-dimethoxy-2-(3-fluoro-4-methoxyphenyl)-2-(4-N,N-dimethylaminophenyl)-2H-benzo(h)chromene;

C22) 5-bromo-2-(2-naphthyl)-2-(4-thiomorpholinophenyl)-2H-benzo(h)chromene;

C23) 9-methoxy-2,2-bis(4-morpholinophenyl)-2H-benzo(h)chromene; and

C24) 5-methoxy-2-(N-methyl-6-( 1,2,3,4-tetrahydroquinolinyl)-2-(2-thienyl)-2H-benzo(h)chromene.

Described below are the structural formulas of the above-mentioned chromene compounds (C1 to C24).

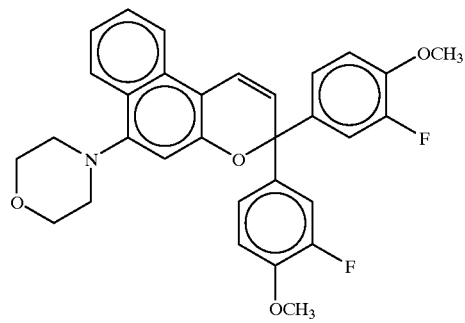
C1)

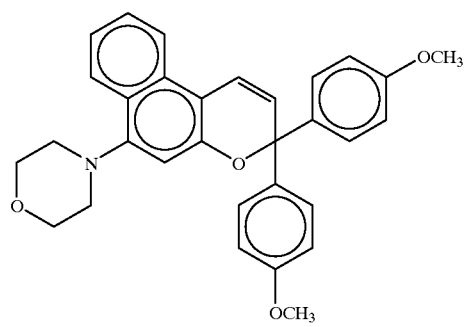
C2)

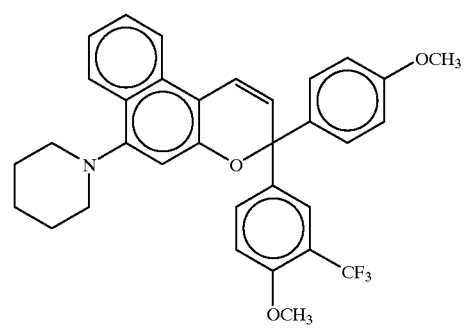
C3)

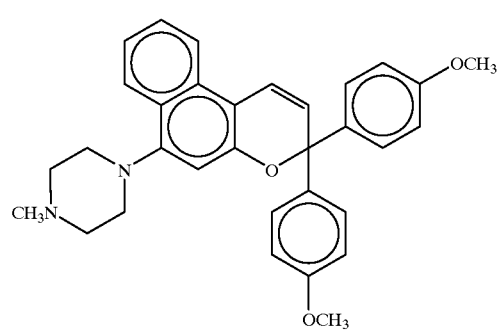
C4)

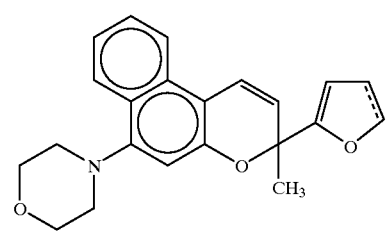
C5)

-continued
C6)
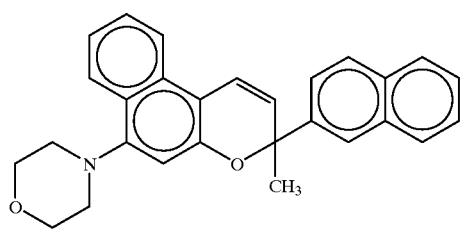
C8)
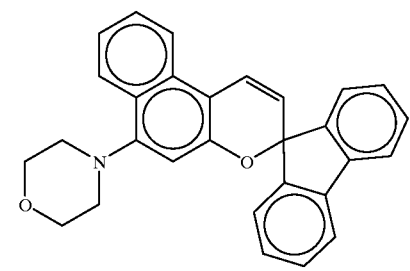
C9)
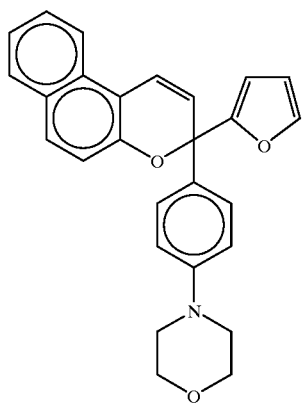
C10)
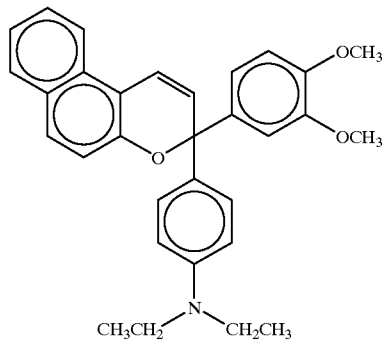
C11)
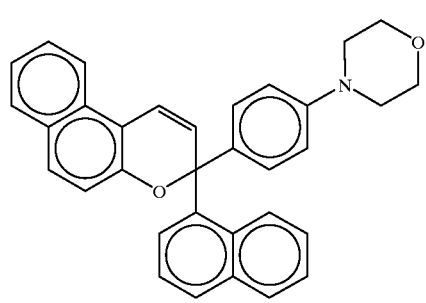
-continued
C12)
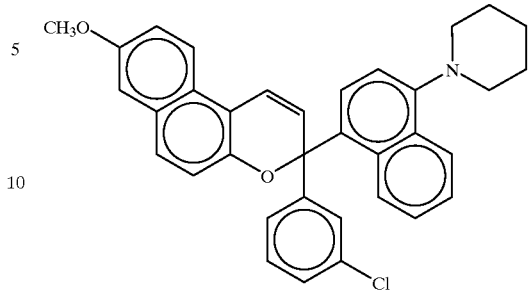
C13)
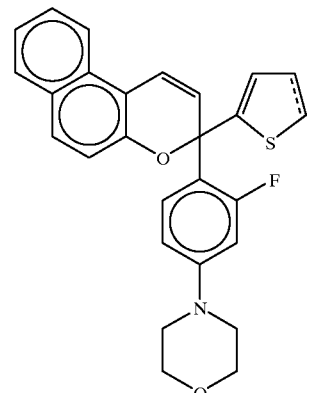
C14)
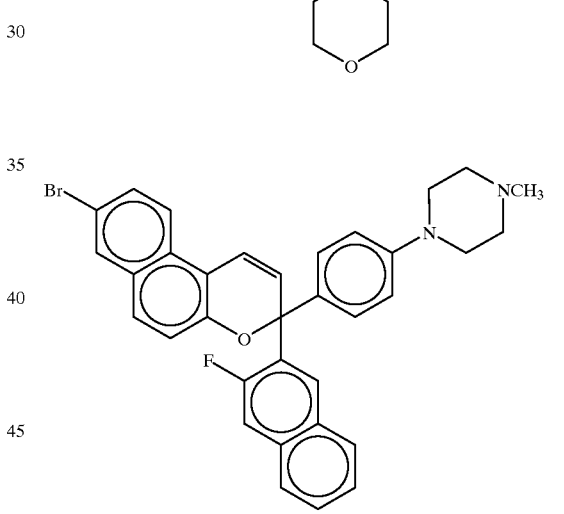
C15)
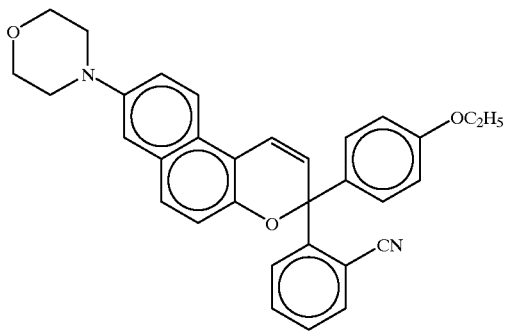

C16)
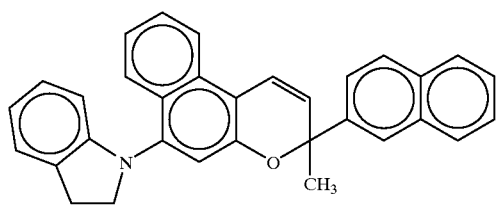
C17)
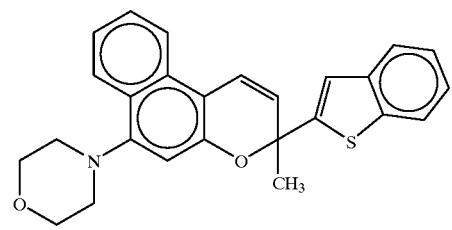
C18)
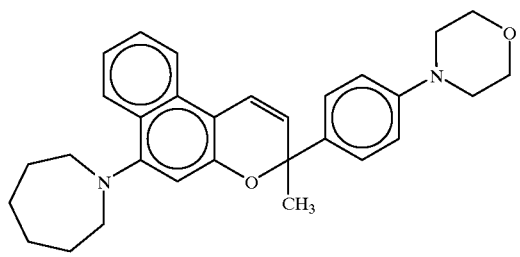
C19)
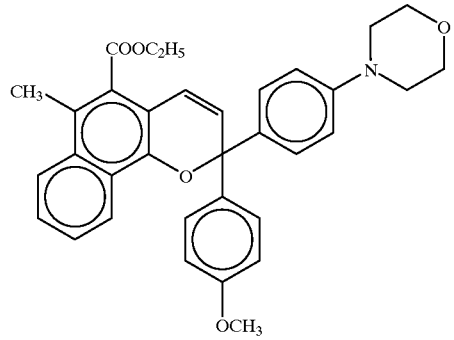
C20)
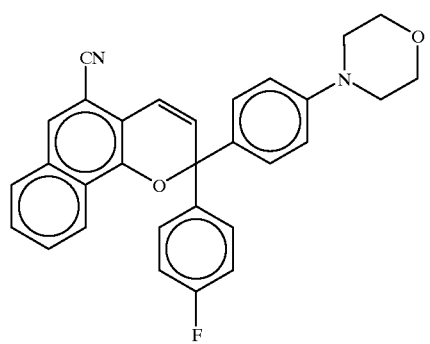
C21)
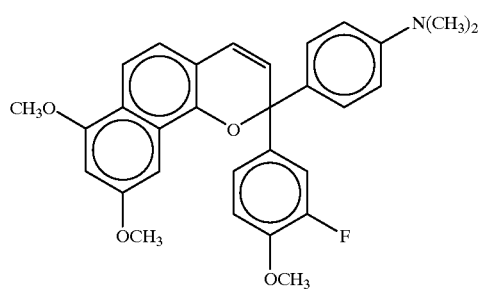
C22)
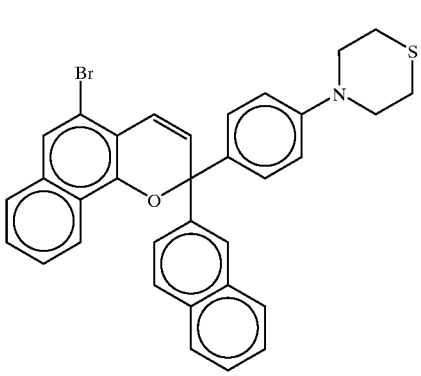
C23)
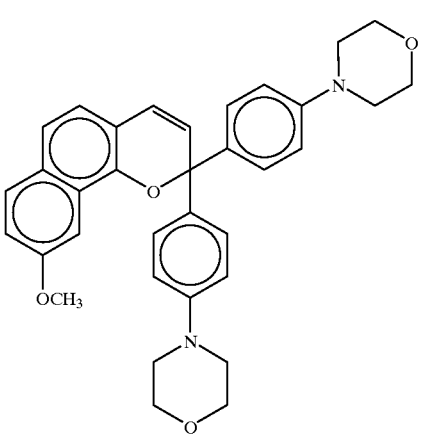
C24)
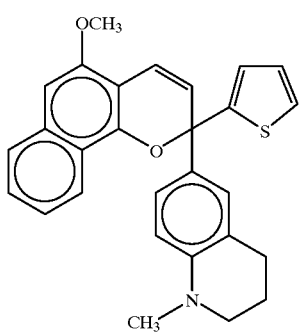

6. Fulgimide compounds.

F1) N-cyanomethyl-4-methyl-6,7-dihydro-2-phenylspiro(5,6-benzo[b]thiophenedicarboxyimide-7,2-tricyclo[3.3.1.1$^{3,7}$]decane);

F2) N-cyanomethyl-4-methyl-6,7-dihydro-2-(4'-methoxyphenylspiro(5,6-benzo[b]thiophenedicarboxyimide-7,2-tricyclo[3.3.1.1$^{3,7}$]decane); and F3) N-cyanomethyl-6,7-dihydro-4-methylspiro(5,6-benzo[b]thiophenedicarboxyimide-7,2-tricyclo[3.3.1.1$^{3,7}$]decane).

7. Oxazine compounds.

SP1) 6'-fluoro-1'-methyl-8"-methoxy-6"-morpholinodispiro(cyclohexane-1,3'-(3H)indole-2'-(2H), 3"-(3H)naphtho(3,2-a)(1,4)oxazine;

SP2) 6'-fluoro-1',5'-dimethyl-6"-morpholinodispiro(cyclohexane-1,3'-(3H)indole-2'-(2H), 3"-(3H)naphtho(3,2-a)(1,4)oxazine;

SP3) 6'-fluoro-1'-isobutyl-6'-morpholinodispiro(cyclohexane-1,3'-(3H)indole-2'-(2H), 3"-(3H)naphtho(3,2-a)(1,4)oxazine; and SP4) 3',3'-dimethyl-1'-isobutylspiro((3H)indole-2'-(2H), 3"-(3H)naphtho(3,2-a)(1,4)oxazine).

Described below are the structural formulas of the above-mentioned fulgimide compounds (F1 to F3) and the oxazine compounds (SP1 to SP4).

F1)
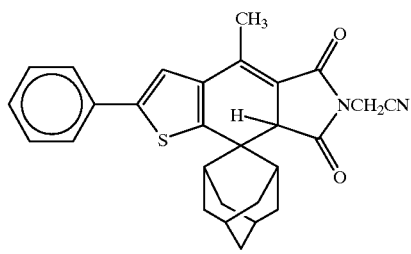

F2)
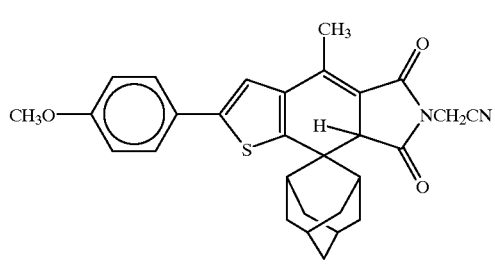

F3)
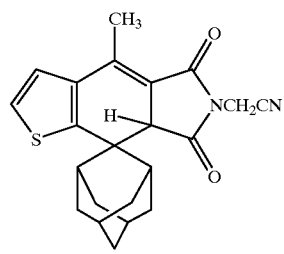

SP1)
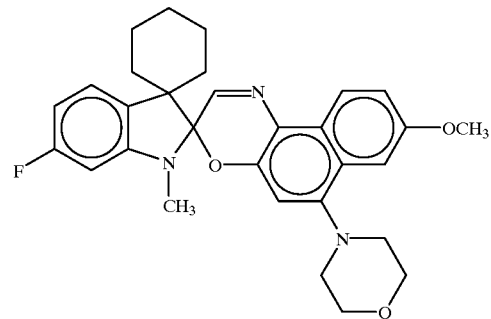

SP2)
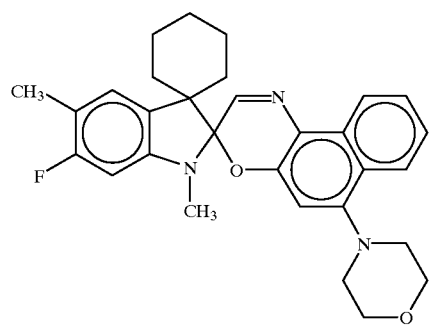

SP3)
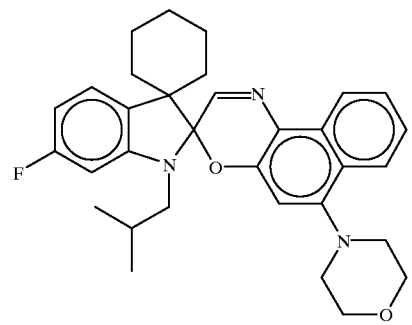

SP4)
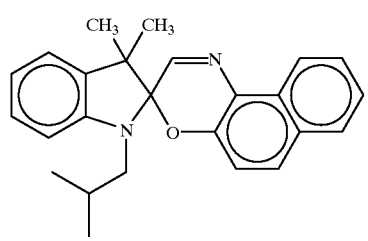

Example 1

90 Parts by weight of "3G" which is a polyfunctional (meth)acrylate monomer and 10 parts by weight of an epoxy compound "GMA" were mixed and stirred at room temperature for two hours, and into the mixture solvent were dissolved, with stirring, 0.05 parts by weight the chromene compound "C1" and 1 part by weight of the perbutyl ND as a polymerization initiator. There was almost no change in the color tone of the mixture solution after the chromene compound had been dissolved. The mixture solution was poured into a mold constituted by a glass plate and a gasket of an ethylene/vinyl acetate copolymer, and was cast-polymerized. The polymerization was conducted by using an air furnace while gradually raising the temperature from 30° C. to 90° C. over a period of 18 hours, and was maintained at 90° C. for two hours. After the polymerization, the polymer was removed from the glass mold.

By using a xenon lamp L-2480 (300 W) SHL-100 manufactured by Hamamatsu Photonics Co., the obtained polymer (2 mm thick) was irradiated with beams of intensities of 365 nm=2.4 mW/cm$^2$ and 245 nm=24 $\mu$W/cm$^2$ on the surface of the polymer through an Aeromas filter (produced by Corning Co.) for 120 seconds to measure the photochromic properties which were expressed in a manner as described below.

① Maximum absorption wavelength ($\lambda$max):

After a color has been developed, $\lambda$max of the polymer was found by using a spectrophotometer (instantaneous multi-channel photodetector MCPD 1000) manufactured by Otsuka Denshi Kogyo Co.

② Color density $(T_0)=\epsilon(120)-\epsilon(0)$

③ $\epsilon(120)$: Absorbancy of the polymer at the maximum absorption wavelength after irradiated for 120 seconds under the above-mentioned conditions.

④ Initial color $\epsilon(0)$: Absorbancy of the polymer at the same wavelength as the maximum absorption wave of when irradiated with light under the non-irradiated condition.

The following testing was conducted in order to promote the aging. Measurement was taken by using a xenon fadometer (FA-25AX-HC) manufactured by Suga Shikenki Co. The light resistance was evaluated by causing the cured product to develop color by the above-mentioned method after irradiated with light by using the above-mentioned xenon fadometer for 200 hours, and by finding a color density $(T_{200})$ from the absorbency at the maximum absorption wavelength based on the color of the photochromic compound at that moment. The color density was evaluated before and after the aging, the initial color density $(T_0)$ and the color density $(T_{200})$ after the testing for promoting the aging were measured, and the light resistance was expressed as follows:

⑤ Light resistance $(\%)=(T_{200}/T_0)\times 100$

Examples 2 to 22

In Example 1, the kinds and amounts of the polyfunctional (meth)acrylate monomers and the epoxy compounds were changed as shown in Table 1 or, depending on the cases, the procedure was carried out in the same manner as in Example 1 but further adding a copolymerizable monomer to obtain the cured products. The obtained cured products were evaluated for their photochromism resistance and initial color by the same evaluation method as that of Example 1. The results were as shown in Table 1.

Examples 23 to 48

Cured products were obtained through the same operation as in Example 4 but changing the chromene compound that is used to the chromene compounds shown in Table 2, and were evaluated for their photochromism resistance and initial color. The results were as shown in Table 2.

Examples 49 to 52

Cured products were obtained through the same operation as in Example 4 but changing the kinds and amounts of the chromene compounds that were used as shown in Table 3 and further adding oxazine compounds and fulgimide compounds, and were evaluated for their photochromism resistance and initial color. The results were as shown in Table 3.

Comparative Examples 1 to 7

Polymerizable compositions were obtained by adding 1 part by weight of the perbutyl ND as a polymerization initiator to the compositions shown in Table 4 followed by mixing and stirring, but without using epoxy compound. The obtained polymerizable compositions were subjected to the same operation as in Example 1 to obtain the cured products which were then evaluated for their photochromism resistance and initial color in the same manner as in Example 1. The results were as shown in Table 4.

The cured products obtained in Comparative Examples exhibited very conspicuous initial colors compared to those of the cured products obtained in Examples and further exhibited markedly decreased photochromism resistance. When no epoxy compound was added, the tone of the developed color changed compared with that of when an epoxy compound was added and, besides, the color tone changed depending on the kind of the monomer.

TABLE 1

| | Epoxy | Radically polymerizable monomer (pts by wt) | | $T_0$ | | Light | Initial color | |
|---|---|---|---|---|---|---|---|---|
| Ex. No. | compound (pts by wt) | Polyfunctional (meth)acrylate | Other monomers | Color density | Color tone | resistance $T_{200}/T_0$ (%) | $\epsilon$ (0) | Initial color tone |
| 1 | GMA: 10 | 3G:90 | — | 1.01 | yellow | 87 | 0.06 | pale yellow |
| 2 | GMA: 1 | 4G:99 | — | 1.12 | yellow | 85 | 0.05 | pale yellow |
| 3 | GMA: 30 | 3PG:70 | — | 1.18 | yellow | 82 | 0.05 | pale yellow |
| 4 | GMA: 9 | 3G:15, 4G:65 | MS:8, MSD:1, HEMA:2 | 1.10 | yellow | 86 | 0.05 | pale yellow |
| 5 | GMA: 9 | 4G:45, 3PG:45 | MSD:1 | 1.15 | yellow | 85 | 0.05 | pale yellow |
| 6 | GMA: 10 | 3G:35, BP-2EM:48 | MS:7, MSD:1 | 1.05 | yellow | 86 | 0.05 | pale yellow |
| 7 | GMA: 10 | 3G:40, BR-MA:20 | MS:9, MSD:1, BzMA:20 | 1.03 | yellow | 87 | 0.06 | pale yellow |
| 8 | GMA: 10 | 3PG:60 | MMA:22, MS:7, MSD:1 | 1.00 | yellow | 86 | 0.06 | pale yellow |
| 9 | GA: 9 | 3G:15, 4G:65 | MS:8, MSD:1, HEMA:2 | 1.09 | yellow | 86 | 0.05 | pale yellow |
| 10 | MGMA: 9 | 3G:15, 4G:65 | MS:8, MSD:1, HEMA:2 | 1.10 | yellow | 85 | 0.05 | pale yellow |
| 11 | MGA: 9 | 3G:15, 4G:65 | MS:8, MSD:1, HEMA:2 | 1.10 | yellow | 86 | 0.05 | pale yellow |
| 12 | BPMGMA: 9 | 3G:15, 4G:65 | MS:8, MSD:1, HEMA:2 | 1.08 | yellow | 86 | 0.05 | pale yellow |
| 13 | GBMA: 9 | 3G:15, 4G:65 | MS:8, MSD:1, HEMA:2 | 1.10 | yellow | 86 | 0.05 | pale yellow |
| 14 | GEHPMA: 9 | 3G:15, 4G:65 | MS:8, MSD:1, HEMA:2 | 1.10 | yellow | 85 | 0.05 | pale yellow |
| 15 | GIHPA: 9 | 3G:15, 4G:65 | MS:8, MSD:1, HEMA:2 | 1.11 | yellow | 85 | 0.05 | pale yellow |
| 16 | EGGE: 4 | 3G:15, 4G:65 | MS:8, MSD:1, HEMA:2 | 1.08 | yellow | 85 | 0.05 | pale yellow |
| 17 | PGGE: 4 | 3G:15, 4G:65 | MS:8, MSD:1, HEMA:2 | 1.08 | yellow | 86 | 0.05 | pale yellow |
| 18 | FDGE: 4 | 3G:15, 4G:65 | MS:8, MSD:1, HEMA:2 | 1.09 | yellow | 85 | 0.05 | pale yellow |

TABLE 1-continued

| Ex. No. | Epoxy compound (pts by wt) | Radically polymerizable monomer (pts by wt) Polyfunctional (meth)acrylate | Other monomers | $T_0$ Color density | Color tone | Light resistance $T_{200}/T_0$ (%) | $\epsilon$ (0) | Initial color Initial color tone |
|---|---|---|---|---|---|---|---|---|
| 19 | HDGE: 4 | 3G:15, 4G:65 | MS:8, MSD:1, HEMA:2 | 1.07 | yellow | 86 | 0.05 | pale yellow |
| 20 | BGE: 4 | 3G:15, 4G:65 | MS:8, MSD:1, HEMA:2 | 1.08 | yellow | 86 | 0.05 | pale yellow |
| 21 | GMA: 10 | 3G:45, TEGDMA:45 | — | 1.02 | yellow | 87 | 0.06 | pale yellow |
| 22 | GMA: 10 | BP-2EM:45, PRO-631:45 | — | 1.07 | yellow | 86 | 0.05 | pale yellow |

TABLE 2

| Ex. No. | Chromene compound | Amount of chromene (pts by wt) | $T_0$ Color density | Color tone | Light resistance $T_{200}/T_0$ (%) | $\epsilon$ (0) | Initial color Initial color tone |
|---|---|---|---|---|---|---|---|
| 23 | C2 | 0.05 | 1.18 | yellowish orange | 84 | 0.10 | pale yellowish orange |
| 24 | C3 | 0.05 | 1.21 | yellow | 82 | 0.11 | pale yellow |
| 25 | C4 | 0.05 | 0.83 | yellowish orange | 79 | 0.10 | pale yellowish orange |
| 26 | C5 | 0.05 | 1.10 | yellow | 82 | 0.07 | pale yellow |
| 27 | C6 | 0.05 | 0.88 | yellow | 83 | 0.01 | no color |
| 29 | C8 | 0.05 | 1.58 | yellow | 71 | 0.12 | pale yellow |
| 30 | C9 | 0.05 | 0.48 | red | 78 | 0.06 | pale red |
| 31 | C10 | 0.05 | 0.40 | reddish violet | 60 | 0.03 | pale reddish violet |
| 32 | C11 | 0.05 | 1.10 | reddish violet | 59 | 0.10 | pale reddish violet |
| 33 | C12 | 0.05 | 1.40 | red | 55 | 0.14 | pale red |
| 34 | C13 | 0.05 | 0.68 | red | 64 | 0.06 | pale red |
| 35 | C14 | 0.05 | 0.65 | orange | 66 | 0.04 | pale orange |
| 36 | C15 | 0.05 | 0.90 | orange | 60 | 0.02 | faint orange |
| 37 | C16 | 0.05 | 0.90 | yellow | 70 | 0.02 | faint yellow |
| 38 | C17 | 0.05 | 1.40 | yellow | 72 | 0.05 | pale yellow |
| 39 | C18 | 0.05 | 0.66 | yellow | 64 | 0.04 | pale yellow |
| 40 | C19 | 0.05 | 0.90 | violet | 67 | 0.06 | pale violet |
| 41 | C20 | 0.05 | 0.85 | violet | 65 | 0.08 | pale violet |
| 42 | C21 | 0.05 | 1.20 | violet | 70 | 0.11 | pale violet |
| 43 | C22 | 0.05 | 1.00 | reddish violet | 65 | 0.05 | pale reddish violet |
| 44 | C23 | 0.05 | 1.05 | bluish violet | 50 | 0.10 | pale bluish violet |
| 45 | C24 | 0.05 | 0.85 | violet | 70 | 0.11 | pale violet |
| 47 | C1 | 0.01 | 0.81 | yellow | 71 | 0.02 | faint yellow |
| 48 | C1 | 0.15 | 1.33 | yellow | 88 | 0.11 | pale yellow |

TABLE 3

| Ex. No. | Chromene compound | Amount of chromene (pts by wt) | Spiro-oxazine compound | Amount of spiro-oxazine (part by weight) | Fulgimide compound | Amount of fulgimide (parts by weight) | $T_0$ Color density | Color tone | Light resistance $T_{200}/T_0$ (%) | Initial color $\epsilon$ (0) |
|---|---|---|---|---|---|---|---|---|---|---|
| 49 | C1 | 0.03 | SP2 | 0.09 | F2 | 0.05 | 0.82 | grey | 81 | 0.03 |
| 50 | C2 | 0.03 | SP1 | 0.07 | F1 | 0.04 | 0.85 | grey | 80 | 0.06 |
| 51 | C3 | 0.05 | SP3 | 0.05 | F3 | 0.05 | 0.80 | brown | 76 | 0.05 |
| 52 | C5 | 0.04 | SP4 | 0.07 | F2 | 0.05 | 0.78 | brown | 72 | 0.02 |

TABLE 4

| Comp. Ex. No. | Chromene compound | Amount of chromene (parts by weight) | Radically polymerizable (parts by weight) Polyfunctional (meth)acrylate | Other monomers | $T_0$ Color density | Color tone | Light resistance $T_{200}/T_0$ (%) | $\epsilon$ (0) | Initial color Initial color tone |
|---|---|---|---|---|---|---|---|---|---|
| 1 | C1 | 0.05 | 3G:100 | — | 1.08 | red | 37 | 0.22 | red |
| 2 | C1 | 0.05 | 4G:100 | — | 1.21 | red | 34 | 0.28 | red |
| 3 | C1 | 0.05 | 3PG:70 | MMA:30 | 1.19 | orange | 33 | 0.26 | orange |
| 4 | C2 | 0.05 | 3G:100 | — | 1.15 | violet | 36 | 0.44 | violet |
| 5 | C1 | 0.05 | 3G:50, TEGDMA:50 | — | 1.10 | red | 35 | 0.23 | red |
| 6 | C1 | 0.05 | TEGDMA:50, 3EG:50 | — | 0.99 | red | 32 | 0.20 | red |
| 7 | C1 | 0.05 | BP-2EM:50, PRO-631:50 | — | 1.00 | orange | 38 | 0.19 | orange |

What is claimed is:

1. A photochromic polymerizable composition comprising:
   (A) at least one polyfunctional (meth)acrylate monomer;
   (B) at least one chromene compound selected from among compounds of the following formulas (3) and (5);

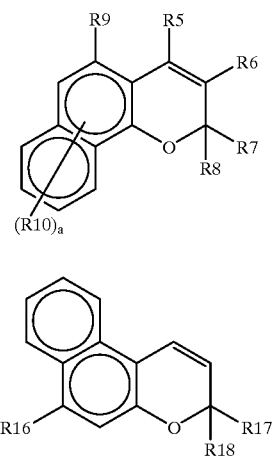

wherein,
R5 and R6 may be the same or different, and represent hydrogen atom, halogen atom, alkyl group or aralkyl group;
R7 and R8 may be the same or different, and represent aryl group or aromatic heterocyclic group; wherein any of the groups R7 and R8 may be further substituted; or
R7 and R8 are bonded to each other to form a ring together with the carbon atom to which they are joined; wherein,
at least one of said aryl group or said aromatic heterocyclic group or said ring group represented by R7 and R8 is substituted by at least one of
   (a) an amino group or
   (b) a nitrogen-containing heterocyclic group, wherein a hetero nitrogen atom of said heterocyclic group (b) is bonded to said aryl group or to said aromatic heterocyclic group or to said ring group formed by R7 and R8;
R9 represents a hydrogen atom or a substituent other than said amino group, said alkyl group or said nitrogen-containing heterocyclic group;
R10 represents a substituent other than said amino group or said nitrogen-containing heterocyclic group on the 6-, 7-, 8-, 9- and/or 10-position of the benzochromene ring,
"a" represents 0, 1, 2 or 3, and, when "a" is 2 or 3, the groups R10 may be the same or different,
R16 represents
   (a) substituted or unsubstituted amino group or
   (b) a nitrogen-containing heterocyclic group bonded to the benzochromene ring via a hetero nitrogen atom,
R17 and R18 may be the same or different, and represent alkyl group, aryl group or aromatic heterocyclic groups which may have a substituent, or
R17 and R18 are bonded to each other to form a ring, together with the carbon atom to which they are bonded; and
   (C) at least one compound having an epoxy group in the molecule.

2. A photochromic polymerizable composition according to claim 1, further comprising (D) polymerization initiator.

3. A photochromic polymerizable composition according to claim 1, wherein (B) comprises at least one compound of formula (5).

4. A photochromic polymerizable composition according to claim 3, wherein, in said compound of formula (5), R16 is a methylamino group, ethylamino group, propylamino group, isopropylamino group, dimethylamino group, diethylamino group, dipropylamino group, methylethylamino group, 2-hydroxyethylamino group, dihydroxyethyl)amino group, di(cyanomethyl)amino groups, diphenylamino group, pyrrolidinyl group, piperidino group, hexamethyleneimino group, 2,2,6,6-tetramethylpiperidino group, morpholino group, 2,6-dimethylmorpholino group, N-methylpiperadinyl group, thiomorpholino group, indolyl group, 2-methylindolyl group, tetrahydroquinolyl group or aziridinyl group.

5. A photochromic polymerizable composition according to claim 1, wherein (B) comprises at least one compound of formula (3).

6. A photochromic polymerizable composition according to claim 5, wherein, in the compound of formula (3) R5 and R6 are both hydrogen atoms.

7. A photochromic polymerizable composition according to claim 5, wherein, in the compound of formula (3), R7 and R8 may be the same or different, and are independently, a member selected from the group consisting of phenyl groups, naphthyl groups, furyl groups, benzofuryl groups, dibenzofuran cyclic groups, thienyl groups, benzothienyl groups, dibenzothiophene cyclic groups, N-methylpyrrolyl groups, indolyl groups, indole cyclic groups, pyridinyl groups, quinolyl groups, isoquinolyl groups, and N-methylcarbazole groups, and wherein the member may have a substitutent.

8. A photochromic polymerizable composition according to claim 5, wherein, in the compound of formula (3), R9 represents a hydrogen atom, trifluoromethoxyl group, alkoxyl group, aralkyl group, acyl group, alkoxycarbonyl group, cyano group, aryl group, acyloxyl group, nitro group, hydroxyl group or halogen atom, and R10 represents alkyl group, alkoxyl group, trifluoromethoxyl group, aralkyl group, acyl group, alkoxycarbonyl group, cyano group, aryl group, acyloxyl group, nitro group, hydroxyl group or halogen atom.

9. A photochromic polymerizable composition according to claim 1, wherein said amino group (a) is present and is represented by the formula

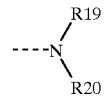

wherein R19 and R20 may be the same or different, and represent hydrogen atoms, substituted or unsubstituted alkyl groups having 1 to 10 carbon atoms, substituted or unsubstituted aromatic hydrocarbon groups having 6 to 10 carbon atoms, or heterocyclic groups.

10. A photochromic polymerizable composition according to claim 1, wherein the nitrogen-containing heterocyclic group (b) is present and is at least one group selected from the group consisting of pyrrolidinyl group, piperidino group, hexamethyleneimino group, 2,2,6,6-tetramethylpiperidino group, morpholino group, 2,6-dimethylmorpholino group, N-methylpiperadinyl group, thiomorpholino group, indolyl group, 2-methylindolyl group, tetrahydroquinolyl group and aziridinyl group.

11. A photochromic polymerizable composition according to claim 1, wherein the compound (C) having at least one epoxy group in the molecule, comprises at least one (meth) acrylic group in the molecule.

12. A photochromic polymerizable composition according to claim 1, wherein the compound (C) having at least one epoxy group in the molecules, is a compound represented by the following formula,

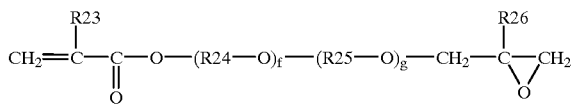

wherein R23 and R26, independently of each other, are hydrogen atoms or methyl groups, R24 and R25 are, independently of each other, alkylene groups having 1 to 4 carbon atoms which may be substituted with the same or different hydroxyl groups, or are groups represented by the following formula,

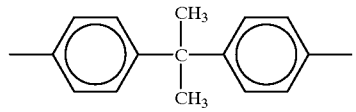

and f and g are, independently of each other, 0 or 1.

13. A photochromic polymerizable composition according to claim 1, containing the chromene compound (B) in an amount of from 0.001 to 10 parts by weight per 100 parts by weight of the whole monomers in the composition.

14. A photochromic polymerizable composition according to claim 13, containing the polyfunctional (meth) acrylate monomer (A) in an amount of from 70 to 100 parts by weight, and said compound (C) having at least one epoxy group in the molecule, in an amount of from 1 to 30 parts by weight.

15. A photochromic polymerizable composition according to claim 1, containing the polyfunctional (meth)acrylate monomer (A) in an amount of from 70 to 100 parts by weight, and said compound (C) having at least one epoxy group in the molecules (C), in an amount of from 1 to 30 parts by weight.

16. A photochromic polymerizable composition according to claim 1, wherein the at least one chromene compound (B) is at least one compound selected from the group consisting of (C1) 3,3-bis(3-fluoro-4-methoxyphenyl)-6-morpholino-3H-benzo(f)chromene, (C2) 3,3-bis(4-methoxyphenyl)-6-morpholino-3H-benzo(f)chromene, (C3) 3-(4-methoxyphenyl)-3-(3-trifluoromethyl-4-methoxyphenyl)-6-piperidino-3H-benzo(f)chromene, (C4) 3,3-bis(4-methoxyphenyl)-6-N-methylpiperadino-3H-benzo(f)chromene, (C5) 3-(2-furyl)-3-methyl-6-morpholino-3H-benzo(f)chromene, (C6) 3-methyl-3-(2-naphthyl)-6-morpholino-3H-benzo(f)chromene, (C8) 6-morpholinospiro(fluorene-9,3'-3H-benzo(f)chromene), (C16) 6-ludolino-3-methyl-3-(2-naphthyl)-3H-benzo(f) chromene, (C17) 3-(2-benzofuryl)-3-methyl-6-morpholino-3H-benzo(f)chromene, (C18) 6-hexamethylamino-3-methyl-3-(4-morpholinophenyl)-3H-benzo(f)chromene.

17. A photochromic polymerizable composition according to claim 1, wherein the at least one chromene compound (B) is at least one compound selected from the group consisting of (C19) 5-ethoxycarbonyl-6-methyl-2-(4-morpholinophenyl)-2-methoxyphenyl-2H-benzo(h) chromene, (C20) 5-cyano-2-(4-fluorophenyl)-2-(4-morpholinophenyl)-2H-benzo(h)chromene, (C21) 7,9-dimethoxy-2-(3-fluoro-4-methoxyphenyl)-2-(4-N,N-dimethylaminophenyl)-2H-benzo(h)chromene, (C22) 5-bromo-2-(2-napthyl)-2-(4-thiomorpholinophenyl)-2H-benzo(h)chromene, (C23) 9-methoxy-2,2-bis(4-morpholinophenyl)-2H-benzo(h)chromene, (C24) 5-methoxy-2-(N-methyl-6-(1,2,3,4-tetrahydroquinolinyl)-2-(2-thienyl)-2H-benzo(h)chromene.

18. A photochromic material comprising the polymerizable composition of claim 1, which is cured.

* * * * *